United States Patent
Schoeny et al.

(10) Patent No.: US 11,357,164 B2
(45) Date of Patent: Jun. 14, 2022

(54) MULTIPLE VARIETY SEED METER OF A PLANTER FOR PLANTING MULTIPLE SEED VARIETIES

(71) Applicant: CNH Industrial American LLC, New Holland, PA (US)

(72) Inventors: Christopher Schoeny, Joliet, IL (US); Chad Johnson, Arlington Heights, IL (US)

(73) Assignee: CNH Industrial America LLC, New Holland, PA (US)

( * ) Notice: Subject to any disclaimer, the term of this patent is extended or adjusted under 35 U.S.C. 154(b) by 351 days.

(21) Appl. No.: 16/591,945

(22) Filed: Oct. 3, 2019

(65) Prior Publication Data

US 2020/0029494 A1    Jan. 30, 2020

Related U.S. Application Data

(62) Division of application No. 15/678,215, filed on Aug. 16, 2017, now Pat. No. 10,524,410.

(51) Int. Cl.
| | | |
|---|---|---|
| A01C 7/20 | (2006.01) | |
| A01C 7/08 | (2006.01) | |
| A01C 7/10 | (2006.01) | |
| A01C 21/00 | (2006.01) | |
| A01C 7/04 | (2006.01) | |
| A01C 15/00 | (2006.01) | |

(52) U.S. Cl.
CPC .............. *A01C 7/206* (2013.01); *A01C 7/082* (2013.01); *A01C 7/088* (2013.01); *A01C 7/102* (2013.01); *A01C 21/005* (2013.01); *A01C 7/046* (2013.01); *A01C 15/006* (2013.01)

(58) Field of Classification Search
CPC ......... A01C 7/206; A01C 7/046; A01C 7/082; A01C 7/088; A01C 7/102; A01C 21/005; A01C 7/20; A01C 7/00; A01C 7/044; A01C 7/042; A01C 7/04; A01C 7/081; A01C 7/08; A01C 7/10; A01C 21/00; A01C 15/005; A01C 15/00; A01C 15/006
See application file for complete search history.

(56) References Cited

U.S. PATENT DOCUMENTS

| | | |
|---|---|---|
| 3,255,857 A | 6/1966 | Armstrong et al. |
| 3,731,842 A | 5/1973 | Schlegel |
| 4,286,530 A | 9/1981 | Conley |
| 6,070,539 A | 6/2000 | Flamme et al. |
| 6,748,885 B2 | 6/2004 | Sauder |
| 7,428,874 B2 | 9/2008 | Jones et al. |
| 7,647,875 B2 | 1/2010 | Landphair et al. |
| 8,196,534 B2 | 6/2012 | Meyer et al. |
| 8,942,894 B2 | 1/2015 | Garner |
| 9,148,992 B2 | 10/2015 | Staeter |
| 9,360,121 B2 | 6/2016 | Garner et al. |

(Continued)

*Primary Examiner* — Christopher J. Novosad
(74) *Attorney, Agent, or Firm* — Rebecca L. Henkel; Rickard K. DeMille

(57) ABSTRACT

A multiple variety seed meter for multi-variety row crop planting a segmented feed pipe system that may include a feed pipe with multiple passages that can be rotated to present one of multiple variety openings toward a seed pool in the seed meter to deliver a specific seed variety into the seed meter. The feed pipe may be an inner selector pipe concentrically nested for rotation in an outer sleeve that extends into the seed meter.

5 Claims, 15 Drawing Sheets

(56) References Cited

U.S. PATENT DOCUMENTS

| | | | |
|---|---|---|---|
| 10,524,410 B2 * | 1/2020 | Schoeny | ............. A01C 21/005 |
| 2015/0223391 A1 | 8/2015 | Wendte et al. | |
| 2015/0282422 A1 | 10/2015 | Hahn et al. | |
| 2015/0289441 A1 | 10/2015 | Arnett et al. | |
| 2016/0037713 A1 | 2/2016 | Wendte | |
| 2016/0143212 A1 | 5/2016 | Wendte et al. | |

\* cited by examiner

MULTIPLE VARIETY SEED METER OF A PLANTER FOR PLANTING MULTIPLE SEED VARIETIES

CROSS-REFERENCE TO RELATED APPLICATION

This application is a division of U.S. Ser. No. 15/678,215, filed Aug. 16, 2017, the entirety of which is incorporated herein.

FIELD OF THE INVENTION

The invention relates generally to planters and, in particular, to planters for planting multiple types or varieties of seed and a multiple variety seed meter with a segmented feed pipe system that selectively delivers seeds of different varieties to a seed meter.

BACKGROUND OF THE INVENTION

Modern farming practices strive to increase yields of agricultural fields. Technological advances of planters allow for better agronomic characteristics at the time of planting, such as providing more accurate seed depth, improved uniformity of seed depth across the planter, and improved accuracy of in-row seed spacing. To reduce operating expenses, farm equipment is operated at relatively faster travel speeds, which reduces the amount of operating time to complete certain tasks. When operating equipment at faster travel speeds, it can be important to maintain the quality of operation and good agronomic characteristics that can be achieved while operating at relatively slower operating speeds. This can be especially difficult to accomplish during planting, which requires precise seed depth placement and spacing accuracy in order to maintain a good seed environment. Furthermore, a single field can have yield performance inconsistencies between different areas of the field. That is because a field can have a wide variety of soil types and management types or zones, such as irrigated and non-irrigated zones in different areas. Seed companies are developing multiple varieties of each of their seed product types to optimize yield in these different areas. The different seed varieties offer improved performance characteristics for different types of soil and management practices. Efforts have been made to plant multiple varieties of a particular seed product type in different areas of fields with different soil types or management zones. These efforts include planters that have different bulk fill hoppers and require the reservoir for each seed meter to be completely cleaned out or planted out before a different seed variety can be delivered to the seed meters. Some planters allow for planting two varieties and include ancillary row units or two separate and distinct seed meters at every row unit. Other planters allow for planting multiple varieties by feeding seeds of different varieties to seed meters at different times.

SUMMARY OF THE INVENTION

The present invention is directed to systems for row crop planting that allow for seeding or planting multiple varieties of seed while providing rapid switchover by delivering different seed varieties to a multiple variety seed meter with a segmented feed pipe system that has multiple passages that selectively deliver the different seed varieties into a seed pool of the seed meter.

According to one aspect of the invention, a multiple variety seed meter is provided for multi-variety row crop planting. The seed meter includes a segmented feed pipe system with multiple variety outlets that deliver different seed varieties from the passages out of a feed pipe within the feed pipe system. The feed pipe may be rotated to align a selected one of the variety outlets to present a selected variety of seed toward a seed pickup region inside the seed meter.

According to another aspect of the invention, a multiple variety seed meter is provided for planting multiple seed varieties in a single planting pass during row-crop planting of an agricultural field. The seed meter may include a seed meter housing arranged at a row unit of a planter. The seed meter has an enclosure that surrounds a housing cavity that can receive seed to define a seed pool. A seed disk may be arranged within the housing cavity and configured to pick up seed from the seed pool at a seed pickup region for singulation of seeds for individual delivery while planting. The seed meter has a segmented feed pipe system with an outlet arranged to deliver seed through the housing and into the seed pool. The segmented feed pipe system may define at least a first position to deliver a first seed variety into the seed pool and a second position to deliver a second seed variety into the seed pool. The different positions may be different angular positions of the segmented feed pipe system.

According to another aspect of the invention, the segmented feed pipe system may include a concentrically nested arrangement with an outer sleeve that extends from the seed meter housing and an inner selector pipe arranged concentrically and rotatably within the outer sleeve. Positions of the segmented feed pipe system may be defined by different angular positions of the inner selector pipe with respect to the outer sleeve.

According to another aspect of the invention, the outer sleeve may include a sleeve outlet port arranged in the housing cavity to define a sump inlet through which seed is delivered into the seed pool. The inner selector pipe may define an inlet end and an outlet end, with multiple selector pipe outlet ports at the outlet end. The outlet ports may be arranged at different angular positions so that rotation of the inner selector pipe can selectively align one of outlet ports with the sleeve outlet port to deliver a corresponding seed variety through the sump inlet. The outer sleeve may include multiple sleeve inlet ports arranged at the selector pipe inlet end to receive the different seed varieties. Multiple seed delivery passages may extend longitudinally through the inner selector pipe for directing the different seed varieties through the inner selector pipe.

According to another aspect of the invention, a seed diverter system may be attached to an end of the inner selector pipe for rotating the inner selector pipe with respect to the outer sleeve. The seed diverter system may include a diverter having plugs that engage the end of the inner selector pipe, such as inserting into ends of various passages, to lock the diverter and inner selector pipe into rotational unison with each other. A diverter drive system may be arranged to rotate the diverter and therefore also the selector pipe with respect to the outer sleeve.

According to another aspect of the invention, the inner selector pipe may include at least one seed purge passage for removing seed from the seed meter through the segmented feed pipe system. A divider wall(s) may extend longitudinally through the inner selector pipe to separate the seed delivery and removal passages.

According to another aspect of the invention, a multiple variety planter is provided for planting different seed varieties in a single planting pass during row-crop planting of an agricultural field. The planter includes a frame, seed storage compartments supported by the frame for respectively storing different seed varieties, and row units supported by the frame. Each of the row units has a seed meter that defines a seed pickup region. A segmented feed pipe system is arranged between the seed meter and the seed storage compartments. The segmented feed pipe system may have a feed pipe with passages that respectively receive the different seed varieties from the seed storage compartments. The feed pipe may be rotatable and have different variety outlets. A seed diverter system may be arranged to drive rotation of the feed pipe for presenting one of the variety outlets of the feed pipe to deliver the corresponding seed variety to the seed pickup region inside the seed meter based on which seed variety is being planted.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
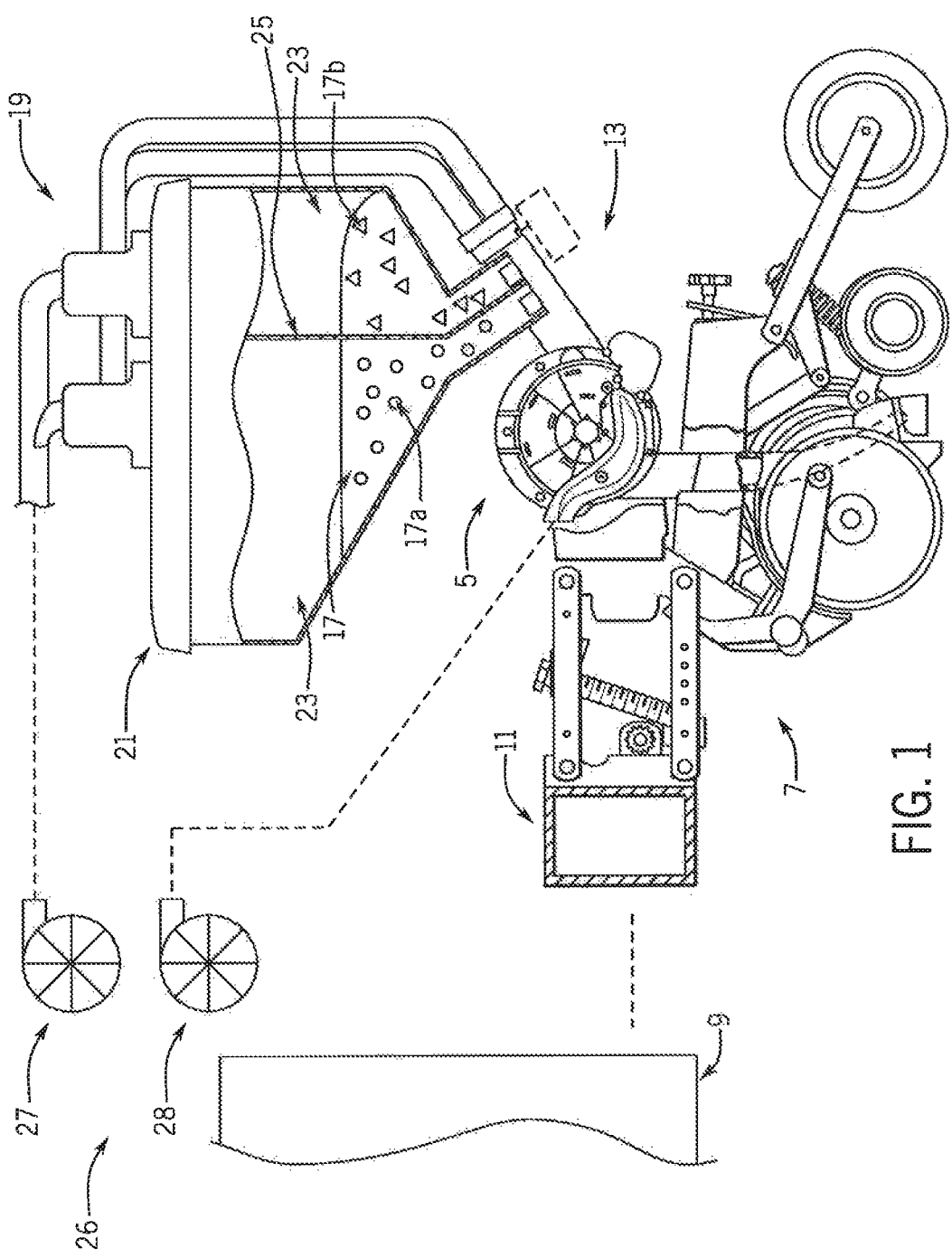
FIG. 1 is a simplified partially schematic side elevation representation of a planter with multiple variety seed meters with segmented feed pipe systems in accordance with the present invention.

Referring now to the drawings and specifically to FIG. 1, a multiple variety seed meter, shown here as seed meter 5, is incorporated in planter 7, only part of which is shown. As explained in greater detail elsewhere herein, a segmented feed pipe system selectively directs seed to seed meter 5 through multiple passages to switch which seed varieties are delivered to a seed pool of seed meter 5.

Still referring to FIG. 1, planter 7 may be one of the EARLY RISER® series planters available from Case IH and is typically pulled by a traction device such as a tractor, schematically represented as tractor 9. A frame 11 of the planter 7 supports multiple row units 13, only one of which is shown, that are substantially identical. Each row unit 13 includes various support, metering, and ground-engaging components. These may include a sub-frame that is connected to the frame 11 of the planter 7 by way of a parallel linkage system and furrow opening and closing mechanisms toward front and back ends of the row unit 13. The opening and closing mechanisms may include opener disks and closing disks, respectively, or other ground-engaging tools for opening and closing a furrow. Each row unit 13 may include a gauge wheel configured for adjusting furrow depth by limiting soil penetration of the furrow-opening mechanism while creating the furrow, and a press wheel may be arranged to roll over the closed furrow and to further firm the soil over the seed to promote favorable seed-to-soil contact.

Still referring to FIG. 1, seed 17 is held in a seed storage system shown here as an on-row seed storage system 19. Seed storage system 19 has at least one on-row hopper, such as at least one on-row hopper per row unit 13, represented here as on-row hopper 21. On-row hopper 21 is shown with two compartments 23 separated by a partition shown as divider wall 25, although it is understood that more than two compartments 23 may be provided, the number of which may correspond to the number of varieties of seeds being used for multiple type or variety planting. Additional compartments 23 may be provided in each of the on-row hoppers 21 by additional divider walls 25 or additional discrete hoppers. It is further understood that although seed storage system 19 is shown here as an on-row storage system, it may instead be implemented as a central bulk storage system with at least one central bulk fill hopper remote from the row units. Such a central bulk storage system may be configured to, for example, pneumatically convey seed from its central bulk storage to the row units, which may include an on-row storage system with mini-hoppers or other storage compartments at the row units. Regardless, the different compartments 23 may hold seed 17 of a different plant type or a common plant type but different varieties such as Variety-A and Variety-B schematically shown as circles and triangles indicated by 17a, 17b for planting in different type or variety zones of an agricultural field. The type or variety zones of the agricultural field may be defined at least in part by characteristics relating to at least one of soil type and management type, or other characteristics such as low/high ground areas, weed issues, insect issues, fungal issues, buffer zones in organic fields that are planted next to non-organic fields, or others, which may be represented in a prescription map, as is known. Although two different seed varieties 17a, 17b are shown, it is understood that other numbers of seed varieties, such as a third variety as Variety-C (not shown) or others, may be stored on and planted by the planter 7 based on, for example, the number of compartments 23 in the seed storage system 19 for a particular planter 7. Even though seed 17 may be described elsewhere herein as different types or varieties, it is understood that the description of the different types or varieties of seed includes different hybrids or products. In other words, the different seed types or varieties 17a, 17b of seed 17 include not only different hybrids or varieties of the same plant species, but also different seed products, including seeds of different species and coated and uncoated seeds, such as insecticide coated and non-insecticide coated seeds. The different seed products can also include refuge in a bag seed and non-refuge in a bag seed, plant-parasite resistant seed and non-plant-parasite resistant seed such as cyst nematodes resistant seeds and non-cyst nematodes resistant seeds, herbicide-tolerant seed and non-herbicide tolerant seed, or other different products. The different seed products can further include different crop seeds such as corn, soybeans, oats, and barley, different cover crops such as tillage radishes and rye, or various combinations of these or other combinations.

Still referring to FIG. 1, planter 7 includes airflow system 26 that provides pneumatic power for use by various components of the planter 7 by way of, for example, positive air pressure source(s) and vacuum source(s) for establishing positive and/or vacuum pressures and corresponding airflows, depending on the particular configurations of the pneumatic system(s) in which they are incorporated. The positive air pressure source(s) and vacuum source(s) can be known pumps, fans, blowers, and/or other known airflow system components and include fittings, tubing, and other components to interconnect components of airflow system 26 to each other and/or components of other systems of planter 7. Airflow system 26 includes a seed purging airflow system 27 and a seed meter airflow system 28. Seed purging airflow system 27 provides pneumatic power such as vacuum pressure that is used by a purging system for removing seed 17 from seed meter 5, discussed in greater detail elsewhere herein. For central bulk fill hopper implementations of seed storage system 19, a seed conveyance airflow system (not shown) may pneumatically deliver the seed 17 from its central storage to the row units 13 and the different varieties 17a, 17b may be selectively directed to corresponding compartments 23 by way of flow-path selecting mechanisms such as gates or valves that select a particular hose or other routing passage for the particular compartment(s) 23. Seed meter airflow system 28 provides negative and/or positive pressure for operation of seed meters 5 at the row units 13, explained in greater detail elsewhere herein.

Figure 2:
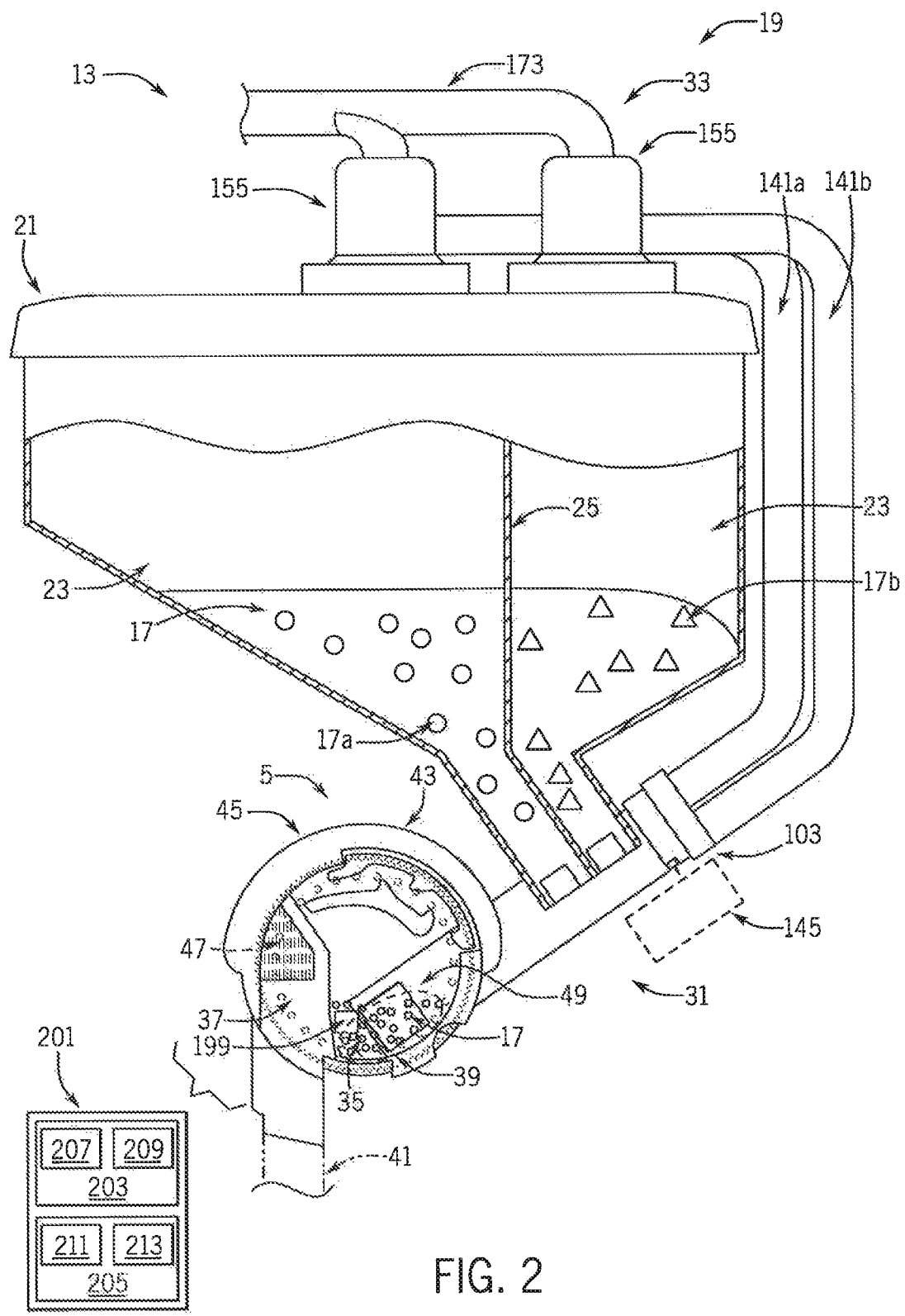
FIG. 2 is a simplified partially schematic side elevation representation of portions of the planter of FIG. 1.

Referring now to FIG. 2, each seed meter 5 can be a purely mechanical-type or a pneumatic-type seed meter 5 that receives a selected seed variety 17a, 17b from segmented feed pipe system 31 to perform multi-variety row crop planting, which may include selectively removing a seed variety 17a, 17b from seed meter 5 with purging system 33. Seed variety 17a, 17b is delivered into or extracted from a collection of seeds as seed pool 35 inside of seed meter 5. Seed disk 37 is rotated through at least part of the seed pool 35 to pick up and singulate seeds using seed pockets or fingers at a seed pickup region 39. The individual seeds are moved through the seed meter 5 for individual release through a seed delivery system 41, which may include a seed tube (unlabeled but schematically shown in FIG. 1), a seed delivery belt, or other seed delivery mechanism, toward a seed trench of the agricultural field. Rotation of seed disk 37 is accomplished by way of a seed disk drive system. The seed disk drive system may include, for example, various electric or hydraulic motors, drive shafts, chains and belts, clutches, peg-and-hole drive systems, and/or other arrangements such as a directly driven arrangement in which a motor directly drives the seed disk at its hub or periphery. Pneumatic seed meters 5 of negative pressure types are further operably connected through a vacuum inlet to the seed meter airflow system 28 (FIG. 1) of airflow system 26 (FIG. 1) to provide a vacuum airflow within a vacuum chamber establishing a negative or vacuum pressure within the seed meter 5 opposite the seed pool 35 allowing the seeds 17 to be held against the seed disk 37 such as within the seed pockets by the vacuum pressure. Pneumatic seed meters 5 of positive pressure types are operably connected through a pressurized air inlet (not shown) to the seed meter airflow system 28 (FIG. 1) to provide a positive airflow and a corresponding positive pressure at the seed side of the seed disk 37 within the seed meter 5, whereby seeds from the seed pool 35 are pushed and held against the seed disk 37, such as within the seed pockets, by positive pressure.

Still referring to FIG. 2, seed meter 5 includes a housing 43 with first and second side portions or covers. The side portions or covers connect to each other at their peripheries defined by respective circumferential side walls with the open ends facing toward each other to collectively define an enclosure 45 that surrounds housing cavity 47 in which seed pool 35 is defined and the seed disk 37 is at least partially arranged for rotation. Although seed disk 37 is shown in FIG. 2 as entirely enclosed within housing 43 and its housing cavity 47, it is understood that at least a portion of seed disk 37 may extend out of the housing 43 and its housing cavity 47. Other components may be arranged within the housing cavity 47, such as various seals that engage seed disk 37 to provide vacuum shutoff or positive pressure isolation, and a seed singulator that is configured to inhibit more than one seed from being discharged from the seed meter 5 per seed discharge event. A brush assembly may be arranged within the housing cavity 47 to form a barrier that retains the seed 17 inside the housing cavity 47 instead of, for example, spilling out of the meter through the seed delivery system. Sump inlet 49 extends through the housing 43, permitting access into housing cavity 47 for delivering seed 17 into the seed pool 35.

Figure 3:
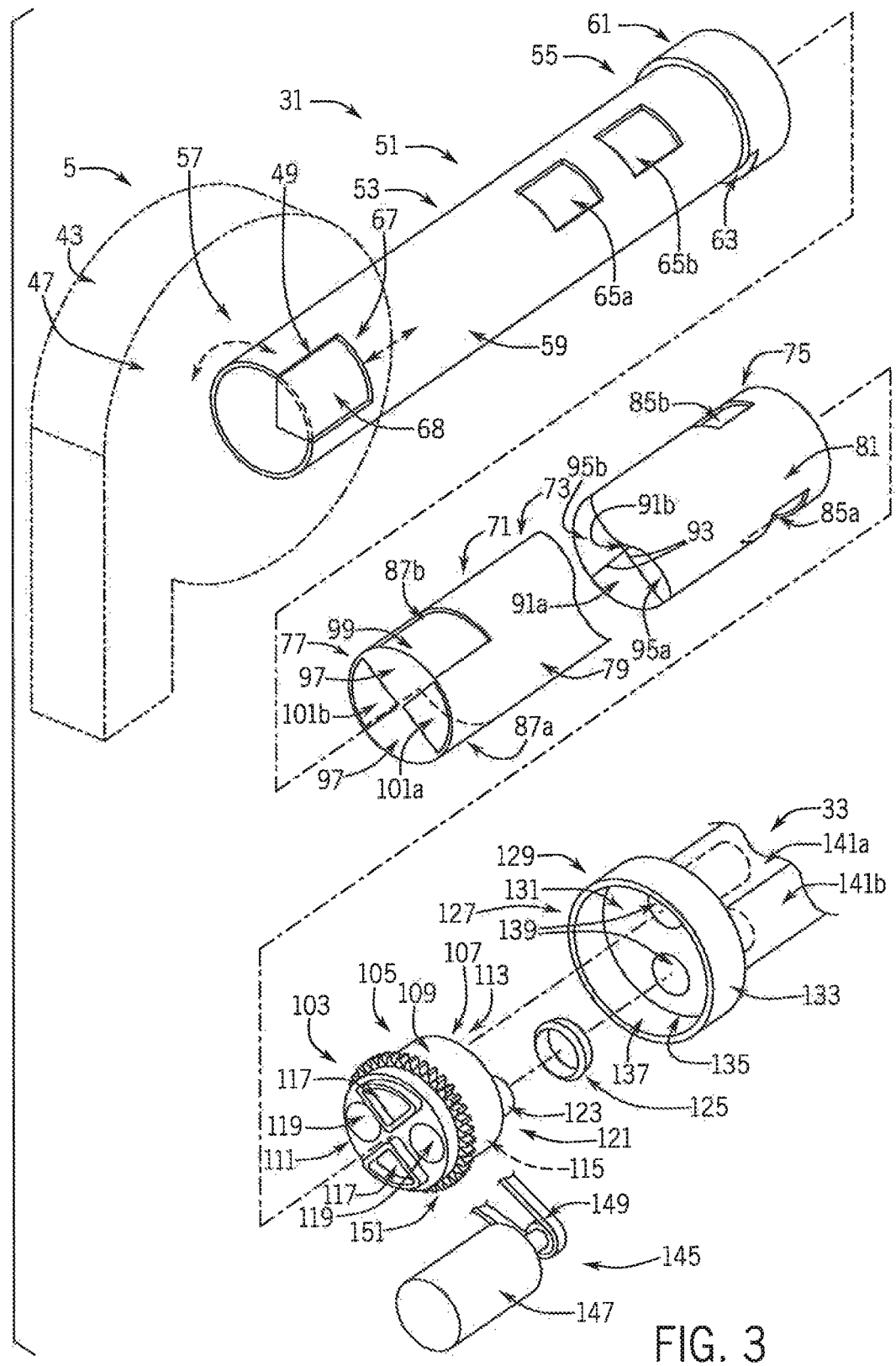
FIG. 3 is a simplified partially schematic pictorial view of the segmented feed pipe system of the multiple variety seed meter of the planter of FIG. 1.

Referring now to FIG. 3, segmented feed pipe system 31 is configured to deliver a selective seed variety 17a, 17b (FIG. 2) through sump inlet 49 into seed pool 35 (FIG. 2). Segmented feed pipe system 31 may define a concentrically nested arrangement of a housing receiver such as a receiver pipe or outer sleeve and an inner selector pipe. The outer sleeve is shown here as sleeve 51 that may be formed as an integral part of the seed meter housing or may be a separate component that is connected to the seed meter housing. Sleeve 51 includes sleeve body 53 that has inlet end 55 and outlet end 57. Inlet end 55 of sleeve body 53 is arranged outwardly of seed meter housing 43, and outlet end 57 is arranged inside housing cavity 47. Sleeve 51 is shown here with a tubular configuration with circumferential side wall 59 and collar 61, shown here with a cutout 63 that provides a slot through collar 61 and sleeve 51. Sleeve inlet ports 65a, 65b provide openings through the circumferential side wall 59 of sleeve 51 through which the seed variety 17a, 17b can selectively flow into the segmented feed pipe system 31. FIG. 2 shows outlets of compartments 23 extending angularly from hopper 21 and overlapping part of sleeve 51 (FIG. 3) with sleeve inlet ports 65a, 65b (FIG. 3) for delivering seed 17 into segmented feed pipe system 31. Referring again to FIG. 3, the number of sleeve inlet ports 65a, 65b may correspond to the number of seed varieties 17a, 17b selectively used with the seed meter 5. Sleeve outlet port 67 defines an outlet of segmented feed pipe system 31 by providing an opening through the circumferential side wall 59 of sleeve 51. Sleeve outlet port 67 is shown here also extending through a bottom wall of sleeve 51 and defining the sump inlet 49. Sump inlet gate 68 may be provided and arranged to selectively cover or uncover the sleeve outlet port 67 to close or open sump inlet 49. An actuator (not shown), which may be an electromechanical actuator such as a solenoid-base or other linear actuator or a stepper or other motor as a rotational actuator, can move the sump inlet gate 68 longitudinally along or rotate about sleeve 51 for selectively closing and opening sump inlet 49.

Still referring to FIG. 3, a feed pipe or inner selector pipe shown as selector pipe 71 that is configured to concentrically and rotatably nest within sleeve 51 and has various openings and passages that allow selector pipe 71 to selectively deliver different seed varieties 17a, 17b into seed meter 5 through sleeve 51. Selector pipe 71 has a tubular configuration and includes selector pipe body 73 with opposite inlet and outlet ends 75, 77. Inlet and outlet ends 75, 77 of selector pipe body 73 are respectively arranged concentrically within the inlet and outlet ends 55, 57 of sleeve 51. Selector pipe 71 is shown here with circumferential side wall 79 that extends about selector pipe interior 81. Selector pipe inlet ports 85a, 85b provide openings through the circumferential side wall 79 through which the seed variety 17a, 17b can flow into the segmented feed pipe system 31 when selectively aligned with a respective sleeve inlet port 65a, 65b. The number of selector pipe inlet ports 85a, 85b may correspond to the number of seed varieties 17a, 17b selectively used with the seed meter 5. Selector pipe outlet ports 87a, 87b selectively align with sleeve outlet port 67 to allow a particular seed variety 17a, 17b to flow through sump inlet 49 and deliver seed to seed meter 5. In this way selector pipe 71 and its outlet ports 87a, 87b provide a feed pipe that may be rotated to align a variety outlet(s) to present a selected variety of seed toward a seed pickup region inside the seed meter.

Still referring to FIG. 3, selector pipe inlets and outlet ports 85a, 85b, 87a, 87b are respectively connected to each other with selector pipe seed delivery passages 91a, 91b that are defined with selector pipe interior 81, separated by interconnected selector pipe divider walls 93. Selector pipe seed purge passages 95a, 95b are also defined between the interconnected selector pipe divider walls 93 for removing seed from seed meter 5, explained in greater detail elsewhere herein. The selector pipe seed delivery and purge passages 91a, 91b, 95a, 95b extend longitudinally along the length of selector pipe 71 and are shown here arranged in an alternating pattern about cross-sectional quadrants of selector pipe 71.

Still referring to FIG. 3, each of the selector pipe seed delivery passages 91a, 91b is shown bounded at its inner end by end wall 97 that may cover the end wall cutout of sleeve outlet end 57 when the selector pipe outlet port 87a, 87b is aligned with the sleeve outlet port 67, thus the sump inlet 49 as shown. Each of the selector pipe seed delivery passages 91a, 91b may have a slanted bottom wall 99 (shown in seed delivery passage 91b) that provides a ramped surface which directs seed out of the respective selector pipe outlet port 87a, 87b through sump inlet 49 and into the seed pool 35 (FIG. 2). Each of the selector pipe seed purge passages 95a, 95b is shown with an open end that defines a purge opening 101a, 101b that aligns with the end wall cutout of sleeve outlet end 57. This allows the removal of seed from the seed pool 35 (FIG. 2) through a purge opening 101a, 101b and corresponding selector pipe seed purge passage 95a, 95b when selector pipe 71 is in a position in which the selector pipe outlet ports 87a, 87b are misaligned with the sleeve outlet port 67, thus the sump inlet 49 is in a closed state with a solid part of the sleeve circumferential side wall 79 blocking the sump inlet 49.

Still referring to FIG. 3, seed diverter system 103 is configured to actuate the segmented feed pipe system 31 for delivering seed to or removing seed from seed meter 5. Seed diverter system 103 is shown here with diverter 105 that is attached to the selector pipe inlet end 75 for repositioning selector pipe 71 within housing sleeve 51.

Still referring to FIG. 3, diverter 105 includes diverter body 107 with a circumferential side wall 109, inner end face 111 that faces toward seed meter 5, and outer end face 113 that faces away from seed meter 5. Diverter 105 is shown here having a hollow canister-like configuration of diverter body 107 with a diverter cavity 115 that is defined as a void space between the circumferential side wall 109 and inner and outer end faces 111, 113. Plugs 117 provide raised projections that extend from inner end face 111 and have perimeter shapes that match those of openings of the selector pipe seed delivery passages 91a, 91b at selector pipe inlet end 75, such as generally triangular with curved outer wall segments. Plugs 117 nest into selector pipe seed delivery passages 91a, 91b so that respective surfaces of the diverter 105 and selector pipe 71 engage each other to lock the diverter 105 and selector pipe 71 to move in unison with each other. Vacuum inlet ports such as diverter body inlet ports 119 align with selector pipe purge passages 95a, 95b and are configured to fluidly connect the pipe purge passages 95a, 95b to the rest of purging system 33 for selectively removing seed from seed meter 5 through the pipe purge passage(s) 95a, 95b and corresponding diverter body inlet port(s) 119 into the diverter cavity 115. Diverter outlet 121 is shown here with an outlet collar 123 that extends longitudinally from outer end face 113 and receives seal 125 to provide a sealed connection between the diverter 105 and a manifold, which is shown here as purge tube manifold 127.

Still referring to FIG. 3, purge tube manifold 127 includes purge tube manifold body 129 with back wall 131 and circumferential side wall 133 that extends from the perimeter of back wall 131, about a void space shown as purge tube manifold cavity 135. Open side 137 is opposite back wall 131 and is configured to receive and hold diverter 105 so that diverter 105 can rotate within the purge tube manifold 127 to selectively align and fluidly connect diverter outlet 121 with one of a pair of purge tube manifold outlets 139 that provide passages through collars that extend outwardly beyond back wall 131. Purge hoses 141a, 141b are connected to the collars of the purge tube manifold outlets 139 and extend from purge tube manifold 127 to the compartments 23 (FIG. 2) of on-row hopper 21 (FIG. 2) to return the seed varieties 17a, 17b (FIG. 2) to the respective compartment(s) 23 (FIG. 2).

Still referring to FIG. 3 diverter drive system 145 is configured to actuate various components of the segmented feed pipe system 31 to deliver a particular seed variety 17a, 17b (FIG. 2) and/or remove a particular seed variety 17a, 17b (FIG. 2) from seed meter 5. Diverter drive system 145 includes an actuator, shown here as motor 147 with an output shaft that rotates a gear to drive belt 149 that rotates a gear or toothed surface 151 of diverter 105 that extends through or is accessible through cutout 63 of sleeve collar 61. This rotates the diverter 105 and selector pipe 71 relative to sleeve 51 for selectively delivering a seed variety 17a, 17b into seed meter 5 or removing a seed variety 17a, 17b from seed meter 5 by aligning corresponding selector pipe outlet port(s) 87a, 87b or purge opening(s) 101a, 101b with sleeve outlet port 67 and sump inlet 49. It is understood that diverter drive system 145 may actuate the components of segmented feed pipe system 31 in other ways, such as directly driving rotation of diverter 105 through intermeshing gears or the like in order to selectively align portions of the corresponding components to allow selective flow of seed 17 (FIG. 2) through a particular selector pipe seed delivery passage 91a, 91b or purge passage 95a, 95b. In the arrangement shown in FIG. 3, diverter drive system 145 can rotate selector pipe 71 in 90-degree increments to provide four discrete positions of which two are purging positions and two are blocked or non-purging positions of diverter body outlet collar 123 and provide seed delivery positions. The four positions include two purging positions that are angularly spaced 180 degrees from each other that align outlet collar 123 with purge hose 141a and purge hose 141b and their manifold outlets 139 for respectively purging seed varieties 17a, 17b. Two non-purging positions are defined by positions of outlet collar 123 that are angularly spaced 180 degrees from each other and align outlet collar 123 with different portions of manifold body back wall 131 between manifold outlets 139, which may block vacuum airflow through diverter system 103. These non-purging positions are seed delivery position that allow for seed to flow through selector pipe 71 toward seed meter 5. The particular amount of rotation of diverter 105 and selector pipe 71 to deliver a new seed variety or purge a previous seed variety is based on the configuration of selector pipe 71, such as the number and location of seed delivery and purge passages, with other variations described in greater detail elsewhere herein.

Figure 4:
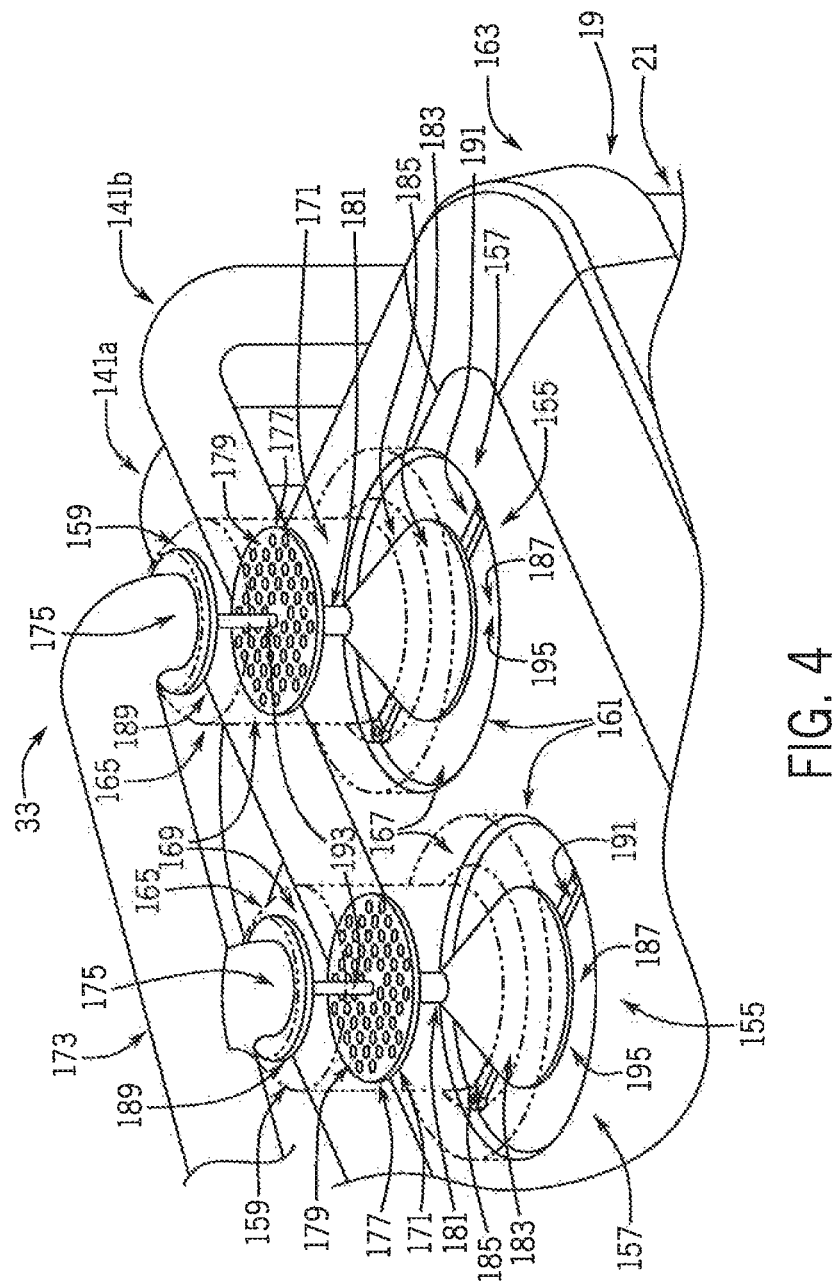
FIG. 4 is an isometric view of portions of a purging system of the multiple variety seed meter of the planter of FIG. 1.

Referring now to FIG. 4, purging system 33 includes seed return valves 155 that are arranged between the seed storage system 19 and purge hoses 141a, 141b to direct seeds removed from seed meter 5 (FIG. 2) into seed storage system 19. Each seed return valve 155 is configured to temporarily hold seed 17 (FIG. 2) that is removed from seed meter 5 (FIG. 2) until being released into the compartments 23 (FIG. 2) of hopper 21 (FIG. 2).

Still referring to FIG. 4, seed return valves 155 may be airlock valve assemblies 157 and are shown here as vacuum-actuated piston airlock valve assemblies, although it is understood that airlock valve assemblies may be other types of airlock valve assemblies. It is further understood that seed return valves 155 may be other valves such as hinged doors, rubber flaps, or doors actively controlled by a pneumatic cylinder or linear actuator. Each of the piston airlock valve assemblies 157 includes valve housing 159 with lower collar 161 shown attached to lid 163 of on-row hopper 21 and dome 165 that extends upwardly from collar 161. Valve housing 159 has a housing interior defined by collar interior 167 within collar 161 and dome interior 169 within dome 165. Each piston airlock valve assembly 157 includes valve plunger 171 that moves within valve housing 159, shown with reciprocating movement, to control the purging flow of seed toward seed storage system 19. Purge vacuum line 173 is shown with two elbows 175 attached to the tops of domes 165 to pull air out of valve housing 159 by vacuum pressure from seed purging airflow system 27 (FIG. 1) that is operably connected to purge vacuum line 173. Instead of a common purge vacuum line 173, a separate purge vacuum line 173 may attach to each valve housing 159. Activating the seed purging airflow system 27 (FIG. 1) to create vacuum pressure and pull air through purge vacuum line 173 creates the movement of valve plunger 171 within valve housing 159 to control the movement of seed out of seed meter 5 (FIG. 1), which may further require a particular position of selector pipe 71 (FIG. 3), depending on the configuration of the selector pipe 71 for activating a purging mode.

Still referring to FIG. 4, valve plunger 171 may define plunger body 177 that includes top plate 179, shown here as a perforated plate. The openings through the perforated top plate 179 provide a purposeful leak through top plate 179, allowing air to flow through it as pulled by vacuum pressure in purge vacuum line 173, while providing enough surface area to react with the vacuum airflow to pull the valve plunger 171 upwardly in valve housing 159. Intermediate stem 181 extends vertically between and connects top plate 179 to lower cone 183 of valve plunger 171. Cone 183 has a conically tapering outer surface that engages a corresponding conically tapering inner surface of valve seat 185 defined by a tapering transition between collar 161 and dome 165 of valve housing 159 to seal the lower portion of valve plunger 171 against valve housing 159 that prevents seeds from falling past the valve plunger 171 through opening 187 in hopper lid 163 and into the compartments 23 (FIG. 2) of hopper 21 (FIG. 2). Furthermore, moving valve plunger 171 upwardly into valve housing 159 shuts off any significant amount of airflow between the compartment(s) 23 and the dome interior(s) 169. This allows vacuum pressure to be applied to purge hoses 141a, 141b for removing seed from seed meter 5 instead of flowing freely though the hopper, which would not pull any seed through the purge hoses 141a, 141b if the valve plunger 171 did not seal against or engage the valve housing 159. Valve seat 185 may be defined by other engaging surfaces of valve housing 159 and valve plunger 171, such as a shoulder or an inner circumferential surface toward the bottom of dome 165 that engages an outer perimeter of a lower portion of cone 183. Vertical movement of valve plunger 171 is bounded at the top by a top wall 189 of dome 165 and at the bottom by stop bar 191 that extends transversely across opening 187 in hopper lid 163. Transverse movement of valve plunger 171 is bounded by guide rod 193 that extends concentrically through a longitudinal bore that extends axially through valve plunger 171.

Figure 5:
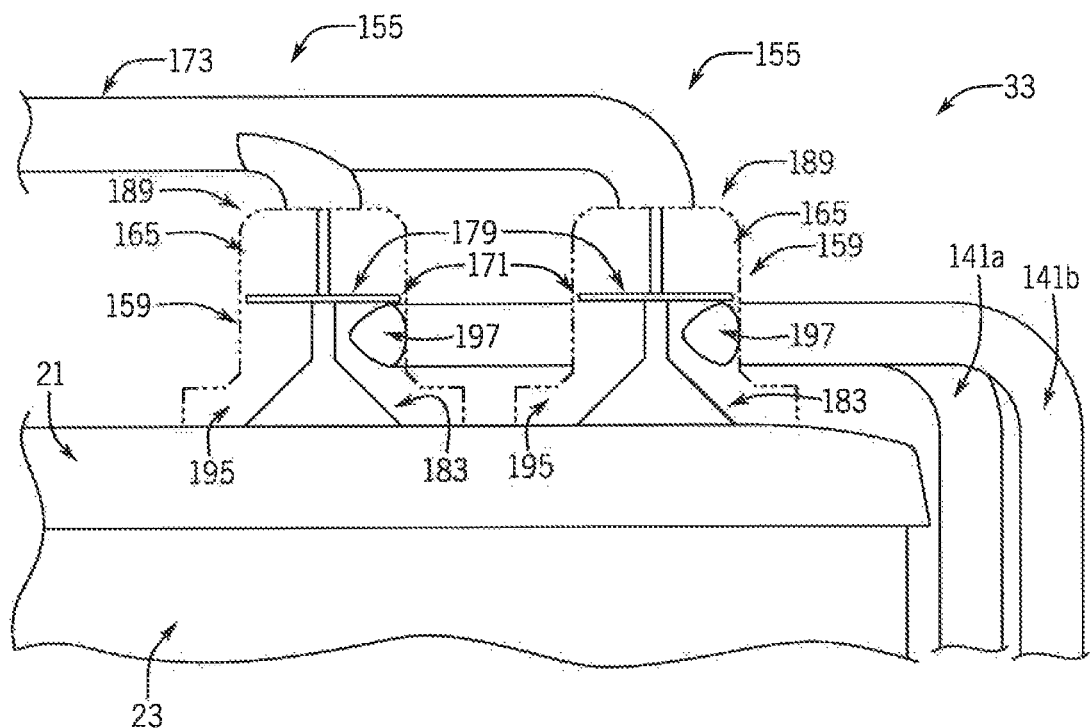
FIGS. 5-8 are cross-sectional views of portions of the purging system of FIG. 4 in different operational states.
Figure 6:
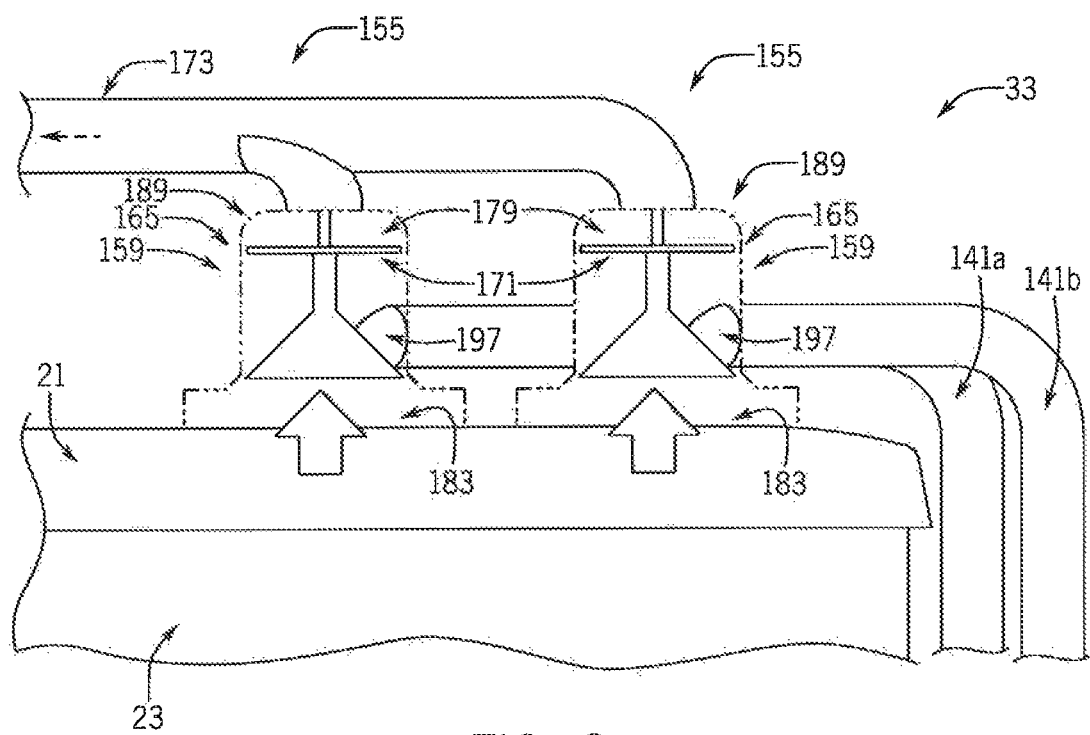

Referring now to FIGS. 5-6, the plunger movement restrictions provided by dome top wall 189, stop bar 191 (FIG. 4), and guide rod 193 (FIG. 4) allow valve plunger 171 to vertically translate in an axial direction up and down within the valve housing 159 between a lowered seed-releasing position (FIG. 5) and a raised seed-collecting position (FIG. 6). Referring now to FIG. 5, the seed-releasing position of valve plunger 171 defines its resting state position, which may be achieved when no vacuum is applied through the purge vacuum line 173 and the valve plunger 171 rests on stop bar 191 (FIG. 4). A seed release passage, shown as an angled gap or annular seed release passage 195, is defined between the cone 183 and the valve housing 159, through which seed 17 (FIG. 2), removed from seed meter 5 (FIG. 2), can be reintroduced into the compartments 23 (FIG. 2) of hopper 21 (FIG. 2). Referring now to FIG. 6, the seed-collecting position of valve plunger 171 defines its active purging state position, which may be achieved when vacuum is applied through the purge vacuum line 173 and the valve plunger 171 is pulled upwardly away from stop bar 191 (FIG. 4) toward dome top wall 189. In this state, the seed release passage 195 (FIG. 5) is closed by the engagement of valve plunger 171 and valve housing 159 so that seed 17 (FIG. 2) is unable to flow out of the seed return valves 155 and airflow is restricted from entering the seed return valves 155 from the compartments 23. Referring again to FIGS. 5-6, valve housing 159 has a valve housing purge inlet 197 to which the respective purge hose(s) 141*a*, 141*b* connects to receive seed 17 (FIG. 2) that is removed from seed meter 5. Valve housing purge inlet 197 extents through a sidewall of dome 165 at a position that is below top plate 179 when valve plunger 171 is in its resting state or lowered seed-releasing position (FIG. 5) and above a bottom edge of cone 183 when in its active purging raised seed-collecting position (FIG. 6).

Figure 7:
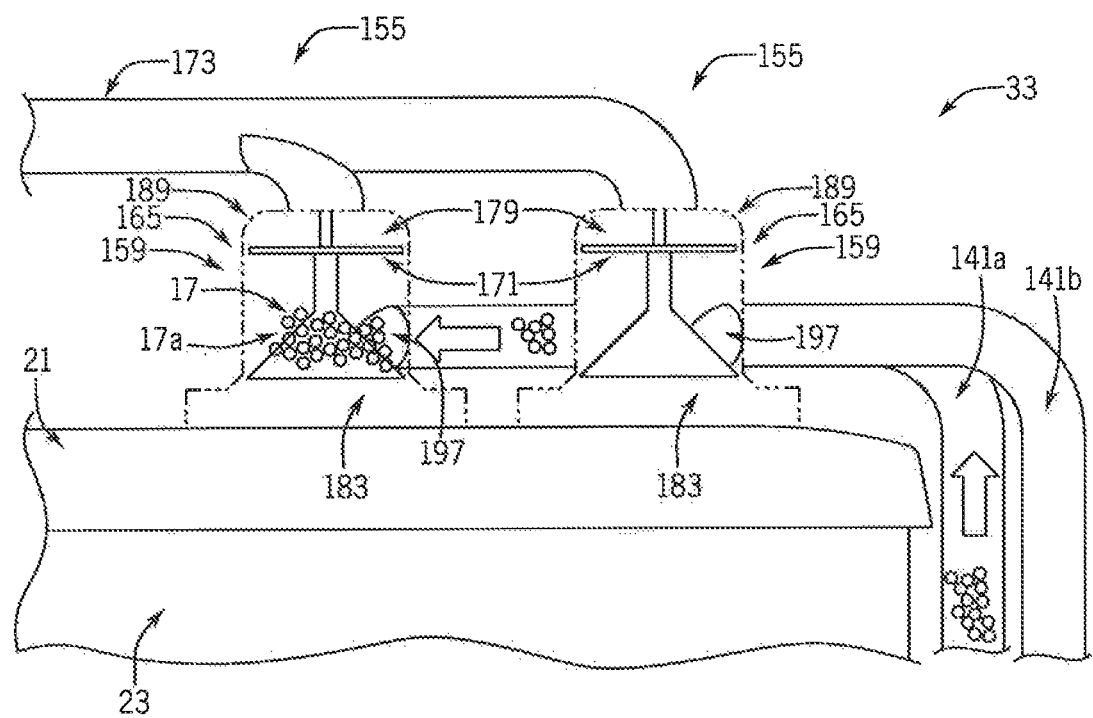
Figure 8:
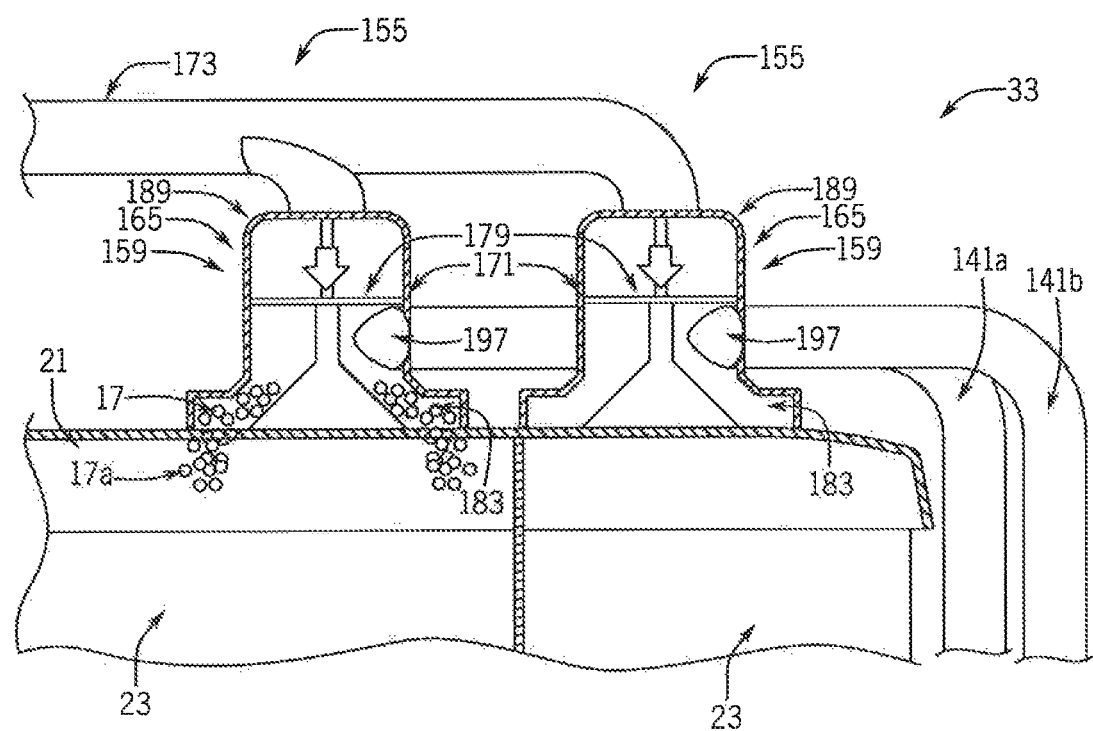

Referring now to FIGS. 7-8, collecting removed seed 17 (FIG. 2) and reintroducing the removed seed 17 (FIG. 2) into storage is shown with seed variety 17*a* as the deactivated variety that is removed, collected, and stored in its respective compartment 23 of hopper 21. During collection, as shown in FIG. 7, seed variety 17*a* is pneumatically carried out of seed meter 5 (FIG. 2) through purge hose 141*a*. This is done by vacuum pressure that pulls air out of purge vacuum line 173. Air is pulled through the openings of valve plunger top plate 179, which also lifts valve plunger 171 to its lifted seed-collecting position. This also pulls air through valve housing purge inlet 197 and purge hose 141*a*. Since the openings in valve plunger top plate 179 are large enough to allow air to flow through top plate 179 but small enough to prevent seed 17 from flowing through top plate 179, seed 17*a* that is entrained in the vacuum airflow collects in seed return valve 155, shown here collecting in dome 165 while the bottom of the valve plunger cone 183 is seated against valve housing 159 as biased upwardly by the vacuum pressure. Referring again to FIG. 2, when seed 17 in seed pool 35 has been sufficiently removed, then the next seed variety 17*b* may be introduced into seed meter 5. The amount of seeds or seed pool level may be determined by a sensor such as seed level sensor 199 that operably communicates with control system 201, that could be used to determine when the seed level has been reduced to an acceptably low level, or a determination of an acceptably low seed level could be based on predictive algorithms based on seed type and planting rate. Referring again to FIGS. 7-8, when it is time to release seed from seed return valve 155 for reintroduction into the compartment 23 of hopper 21, control system 201 (FIG. 2) may coordinate the release of seed from seed return valve 155 into compartment 23 with the determination of the acceptably low seed level in seed meter 5. This may be done by stopping the vacuum airflow through purge vacuum line 173 when the acceptably low seed level of seed meter 5 is determined. Stopping the vacuum airflow through purge vacuum line 173 eliminates the vacuum pressure that holds the valve plunger 171 in its lifted seed-collecting position. As shown in FIG. 8, this causes valve plunger 171 to fall down to its resting state or seed-releasing position, which allows seed 17 to fall between valve housing and plunger 159, 171 and into compartment 23 of hopper 21. Coordinating these seed purging and storage reintroduction events with seed delivery events into seed meter 5 is done with control system 201 (FIG. 2).

Referring again to FIG. 2, control system 201 includes tractor control system 203 and planter control system 205 that operably communicate with each other, for example, by way of an ISOBUS connection, for coordinating controls of tractor 9 (FIG. 1) and planter 7 (FIG. 1), including which seed variety(ies) 17*a*, 17*b* is delivered, based on the type or variety zones Variety-A, Variety-B, or other of the agricultural field. Variety zones Variety-A, Variety-B may correspond to a seed type or variety prescription map PM as schematically represented in the path map shown in FIG. 16. Tractor control system 203 is shown having a tractor controller 207 and power supply 209, and planter control system 205 is shown having a planter controller 211 and power supply 213. Still referring to FIG. 2 and with background reference to FIG. 1, each of the tractor and planter controllers 207, 211 can include an industrial computer or, e.g., a programmable logic controller (PLC), along with corresponding software and suitable memory for storing such software and hardware, including interconnecting conductors for power and signal transmission for controlling respective electronic, electro-mechanical, hydraulic, and pneumatic components of the tractor 9 and planter 7. Tractor controller 207 is configured for controlling the functions of the tractor 9 by controlling, e.g., steering, speed, braking, shifting, and other operations of the tractor, which may include controlling various GPS steering or other GPS-related systems, transmission, engine, hydraulic, and/or other systems of the tractor 9. A tractor interface system is operably connected to the tractor controller 207 and includes a monitor and various input devices to allow an operator to see the statuses and to control various operations of the tractor 9 from within the cab of the tractor 9. The tractor interface system may be a MultiControl Armrest™ console available for use with the Maxxum™ series tractors from Case IH. Planter controller 211 is configured for controlling the functions of planter 7 by controlling, e.g., product conveyance along the planter 7, seed 17 variety delivery selection, and seed delivery out of planter 7 to the field. This may include controlling the positive pressure and vacuum pumps and/or other vacuum sources, as well as fans, blowers, actuators, and other components of any seed conveyance system(s) and seed purging and seed meter airflow systems 27, 28, as well as controlling other characteristics of seed meter 5 such as adjusting singulator and baffle settings by way of controlling corresponding solenoids, stepper motors, or the like. Planter controller 211 also controls segmented feed pipe system 31 and purging system 33 by sensing various states and delivering control signals to automatically control the variety of seed that is in and delivered to seed pool 35 by controlling seed purging airflow system 27, including airflow through purge vacuum line 173, as well as controlling diverter drive system 145, sump inlet gate 68, and/or other actuators or controllable components with the segmented feed pipe system 31, purging system 33, and storage system 19, based on the type or variety zones Variety-A, Variety-B in the prescription map schematically represented in the path map of FIG. 16. During use, control system 201 can determine planter position, speed, heading, and/or other movement characteristics by way of monitoring tractor position and movement through the tractor controller 207. Tractor controller 207 may evaluate, for example, a speed input signal from a tractor speed sensor along with a GPS signal or data from tractor GPS with respect to the prescription map. Using such evaluations, control system 201 determines which row units 13 should plant which seed variety(ies) 17*a*, 17*b* and when, to achieve such multi-seed variety planting. The planter controller 211 commands delivery of the appropriate seed variety to seed meter 5 by way of manipulating selector pipe 71, which may include removing a deactivated seed variety from seed meter 5 with the purging system 33, to plant specific varieties in specific locations. The particular way in which control system 201 commands switching between seed varieties, including control of segmented feed pipe system 31 and/or purging system 33 to selectively define delivery and/or purging routes through the respective systems, also depends on the particular system and components configurations.

Figure 9A:
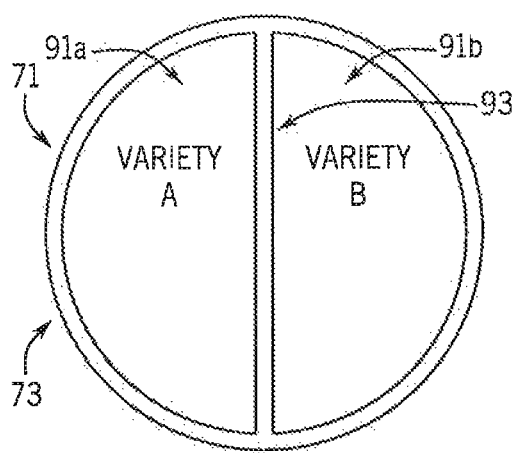
FIGS. 9a-10d are cross-sectional views of various selector pipes of the segmented feed pipe system of the multiple variety seed meter of the planter of FIG. 1.
Figure 9B:
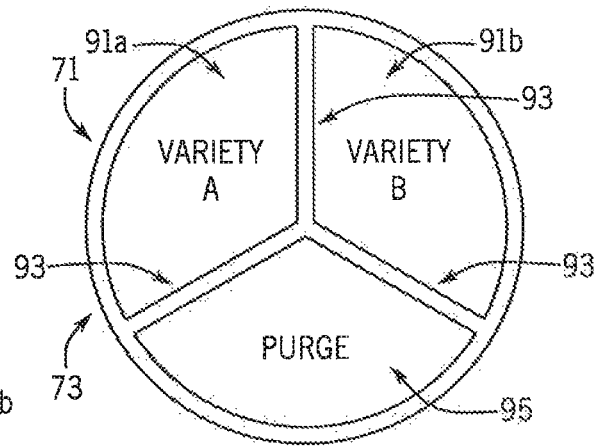
Figure 9C:
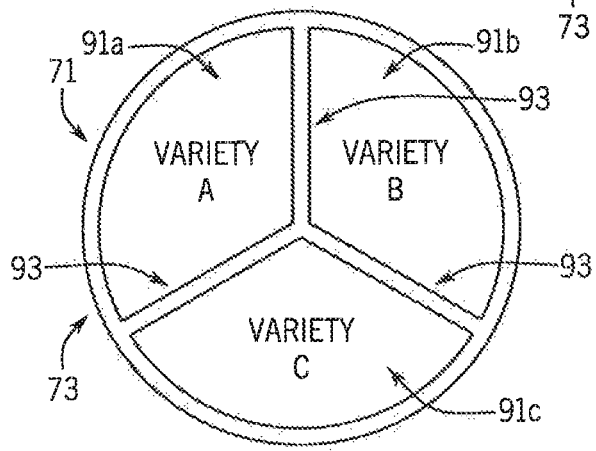

Referring generally to FIGS. 9a-9g and 10a-10d, cross-sections of various different configurations of selector pipe 71, with different numbers of seed delivery and purge passages and different exemplary arrangements with respect to each other, are shown. FIG. 9a shows a configuration of selector pipe 71 without a purge passage and instead with two seed delivery passages 91a, 91b for delivering two seed varieties 17a, 17b (FIG. 2) and that are separated by a single selector pipe divider wall 93. FIGS. 9b-9c show configurations of selector pipe 71 with three passages separated by three wall segments or divider walls 93. FIG. 9b shows selector pipe 71 with a single purge passage 95 and two seed delivery passages 91a, 91b for delivering two seed varieties 17a, 17b (FIG. 2) into seed meter 5 (FIG. 2). FIG. 9c shows selector pipe 71 without a purge passage and instead with three seed delivery passages 91a, 91b, 91c for delivering three seed varieties 17a, 17b (FIG. 2), 17c (not shown) into seed meter 5 (FIG. 2).

Figure 9D:
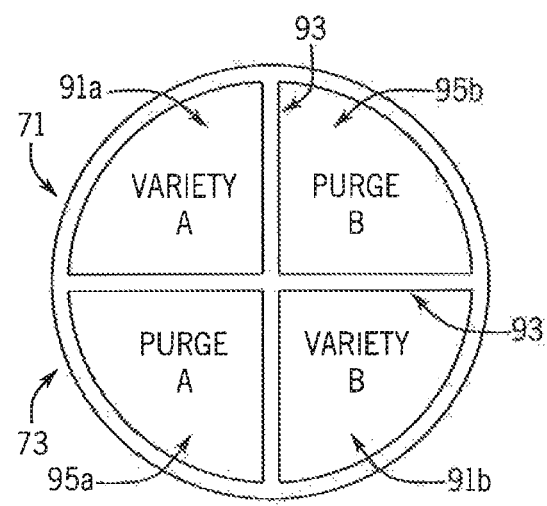
Figure 9E:
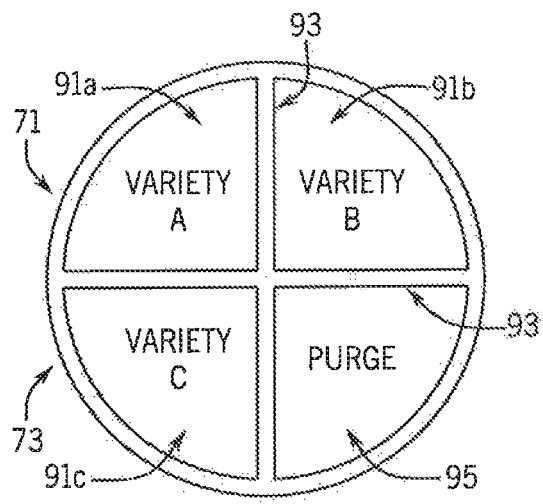
Figure 9F:
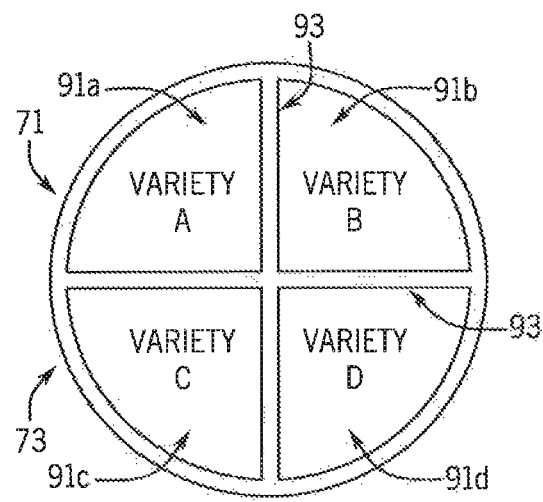
Figure 9G:
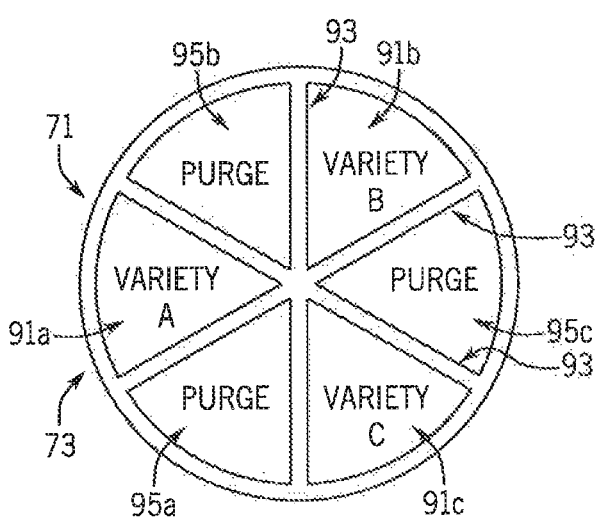

Referring now to FIGS. 9d-9f, each selector pipe body 73 has four passages with all of its passages separated by four divider wall segments or two intersecting selector pipe divider walls 93. FIG. 9d shows a configuration of selector pipe 71 like that of FIG. 3, with selector pipe seed delivery passages 91a, 91b arranged diagonally across from each other and selector pipe purge passages 95a, 95b arranged diagonally across from each other, as an alternating arrangement of selector pipe seed delivery and purge passages. FIG. 9e shows a configuration of selector pipe 71 with a single purge passage 95 and three seed delivery passages 91a, 91b, 91c, for delivering three seed varieties 17a, 17b (FIG. 2), 17c (not shown) into seed meter 5 (FIG. 2). FIG. 9f shows a configuration of selector pipe 71 without a purge passage and instead with four seed delivery passages 91a, 91b, 91c, 91d for delivering four seed varieties 17a, 17b (FIG. 2), 17c, 17d (not shown) into seed meter 5 (FIG. 2). FIG. 9g shows a configuration of selector pipe 71 with six wall segments or three intersecting divider walls 93 between which six passages are defined. The six passages are shown here as three seed delivery passages 91a, 91b, 91c, that are arranged in an alternating pattern with three purge passages 95a, 95b, 95c for delivering and removing three seed varieties 17a, 17b (FIG. 2), 17c (not shown).

Figure 10A:
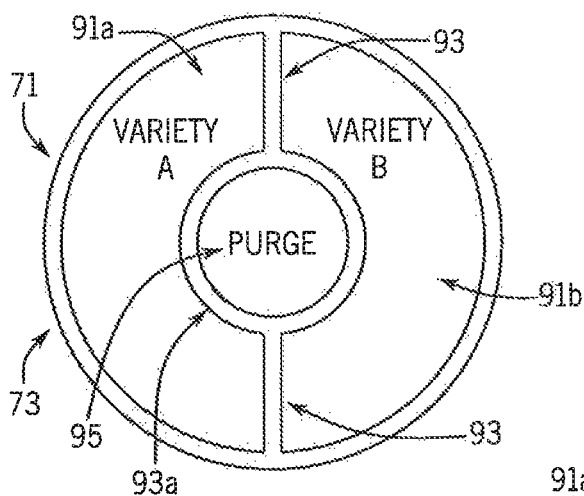
Figure 10B:
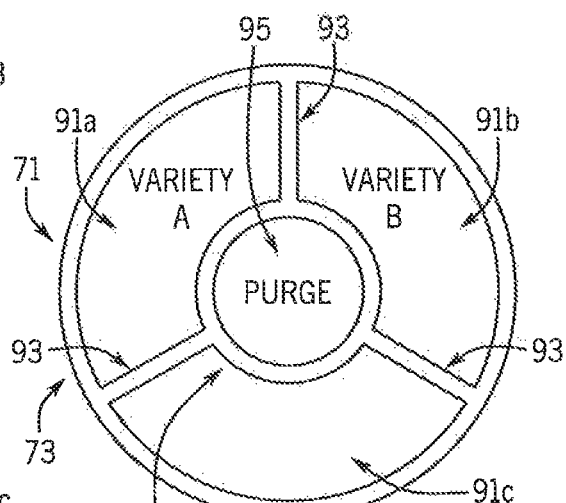
Figure 10C:
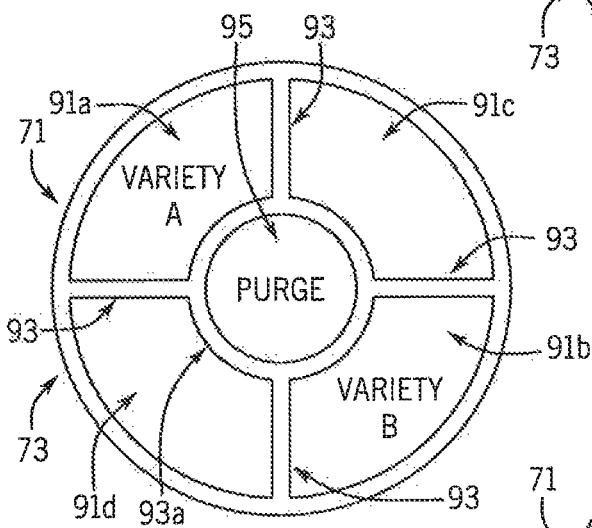
Figure 10D:
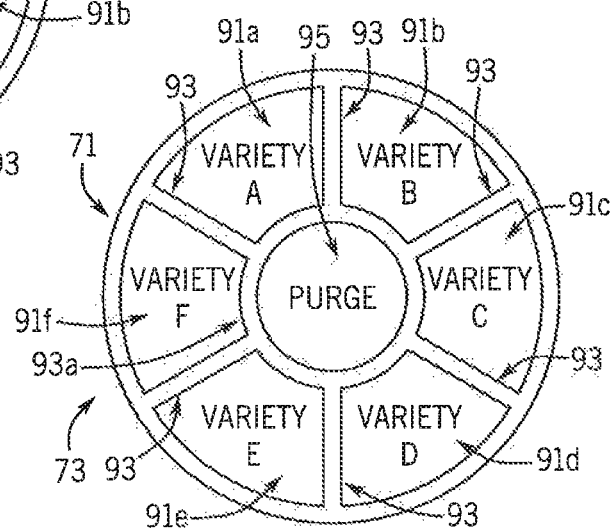
Figure 11:
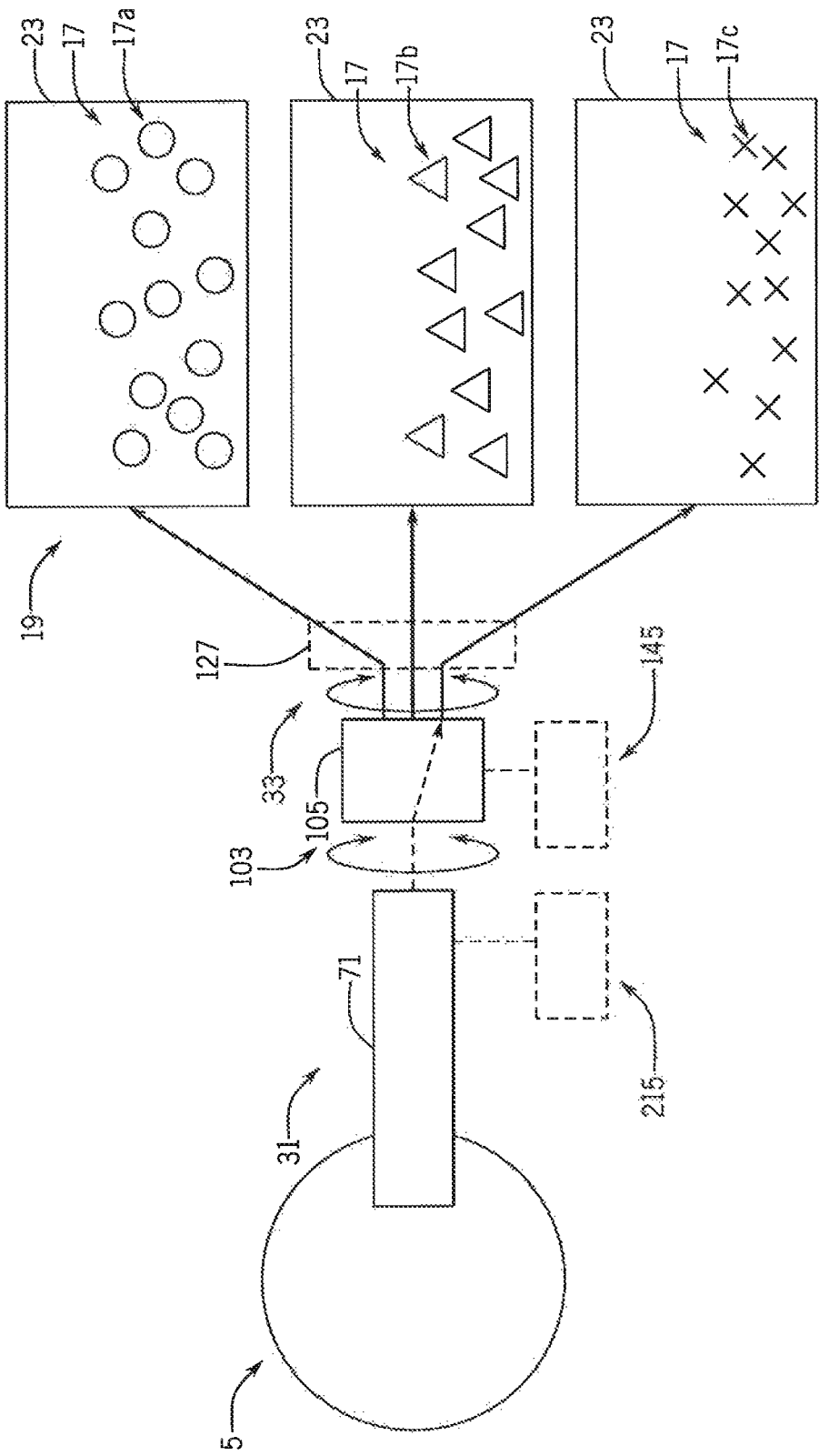
FIG. 11 is a simplified schematic representation of a variant of the segmented feed pipe and purging systems.

Referring now to FIGS. 10A-10d, each selector pipe 71 is shown with a central purge passage defined inwardly of a circumferential divider wall 93a that is concentrically surrounded by multiple seed delivery passages. FIG. 10a shows selector pipe 71 with two seed delivery passages 91a, 91b that together define an annular seed delivery passage region of the selector pipe 71 that is outward of a central seed purge region. FIG. 10b shows three outer seed delivery passages 91a, 91b, 91c with the third passage 91c shown blank or unlabeled for seed variety. Third passage 91c may be capped or plugged to define a plugged passage through which material cannot flow, although it is understood that the third passage 91c may deliver a third seed variety 17c (unlabeled) to seed meter 5 (FIG. 2). FIG. 10c shows four outer seed delivery passages 91a, 91b, 91c, 91d with the first and second seed delivery passages 91a, 91b arranged across from each other for delivering first and second seed varieties 17a, 17b (FIG. 2) into seed meter 5 (FIG. 2). The third and fourth seed delivery passages are shown arranged across from each other and blank or unlabeled for seed variety. These third and fourth passages 91c, 91d may be capped or plugged to define plugged passages through which material cannot flow, although it is understood that the third and fourth passages 91c, 91d may deliver third and fourth seed varieties 17c, 17d (not shown) to seed meter 5 (FIG. 2). FIG. 10d shows six outer seed delivery passages 91a, 91b, 91c, 91d, 91e, 91f arranged concentrically outward of central purge passage 95 for delivering six seed varieties 17a, 17b (FIG. 2), 17c, 17d, 17e, 17f (not shown) into seed meter 5.

Referring again generally to FIGS. 9a-9g and 10a-10d, switchover events and switching preparation may differ based on the particular configuration of selector pipe 71. When selector pipe 71 has no purge passages, such as those shown in FIGS. 9a, 9c, and 9f, or plugged passages or sections, then initial switching preparation may include moving sump inlet gate 68 (FIG. 3) to close the sump inlet 49 (FIG. 3) in order to plant-out at least some of the remaining seed 17 (FIG. 2) from the seed pool 35 (FIG. 2) before actively switching to a different seed variety. When selector pipe 71 has purge passages, such as those shown in FIGS. 9b, 9d-9e, 9g, and 10a-10d, then initial switching preparation may also include moving sump inlet gate 68 (FIG. 3) to close the sump inlet 49 to stop delivery of the current seed variety while expediting the initial switching preparation by removing seeds from the seed pool 35 (FIG. 2) and pneumatically returning the removed seeds to the storage system 19 (FIG. 1) by way of purging system 33.

Referring now to FIGS. 11-15, these purging systems 33 are variations of that shown in FIGS. 2-3. Referring now to the simplified schematic representation of FIG. 11, segmented feed pipe system 31 and seed diverter system 103 are individually actuatable for separately controlling seed delivery and removal paths into and from seed meter 5. This may be done by rotating selector pipe 71 with its own selector pipe drive system 215 that is substantially the same as diverter drive system 145. Selector pipe drive system 215 drives rotation of selector pipe 71 independently of the rotation of diverter 105 done by way of diverter drive system 145. Diverter 105 in FIG. 11 does not have interlocking plugs 117, like those shown in FIG. 3, so that selector pipe 71 and diverter 105 can freely rotate with respect to each other, as controlled by their respective selector pipe and diverter drive systems 215, 145. This configuration facilitates using a single purge passage or shared purge passages so that any seed variety that is removed from seed meter 5 can, for example, flow into a single space of diverter cavity 115 (FIG. 3) and be directed to the correct compartment 23 for the particular seed variety 17a, 17b, 17c by rotating diverter 105 within purge tube manifold 127.

Figure 12:
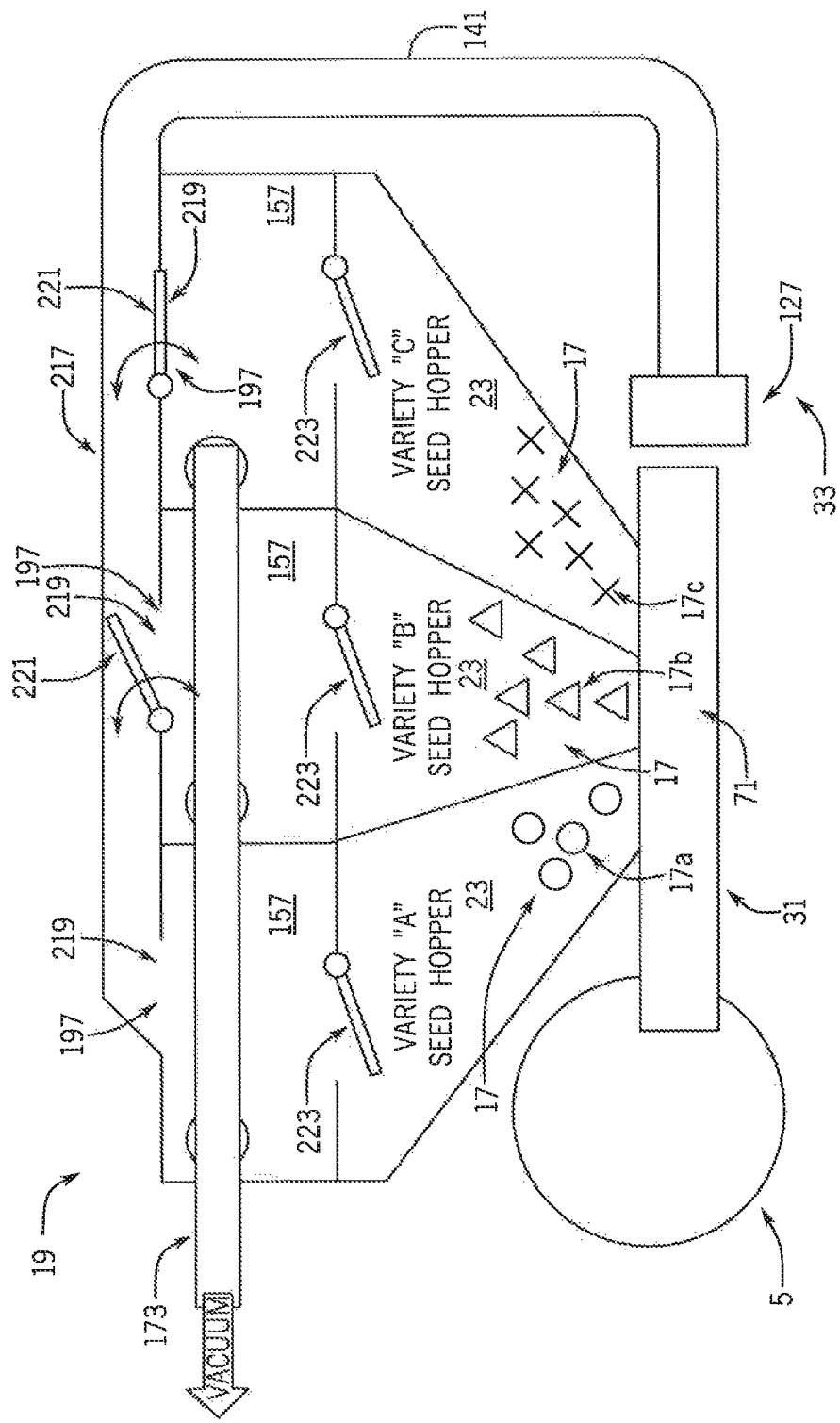
FIG. 12 is a simplified schematic representation of another variant of the segmented feed pipe and purging systems.
Figure 13:
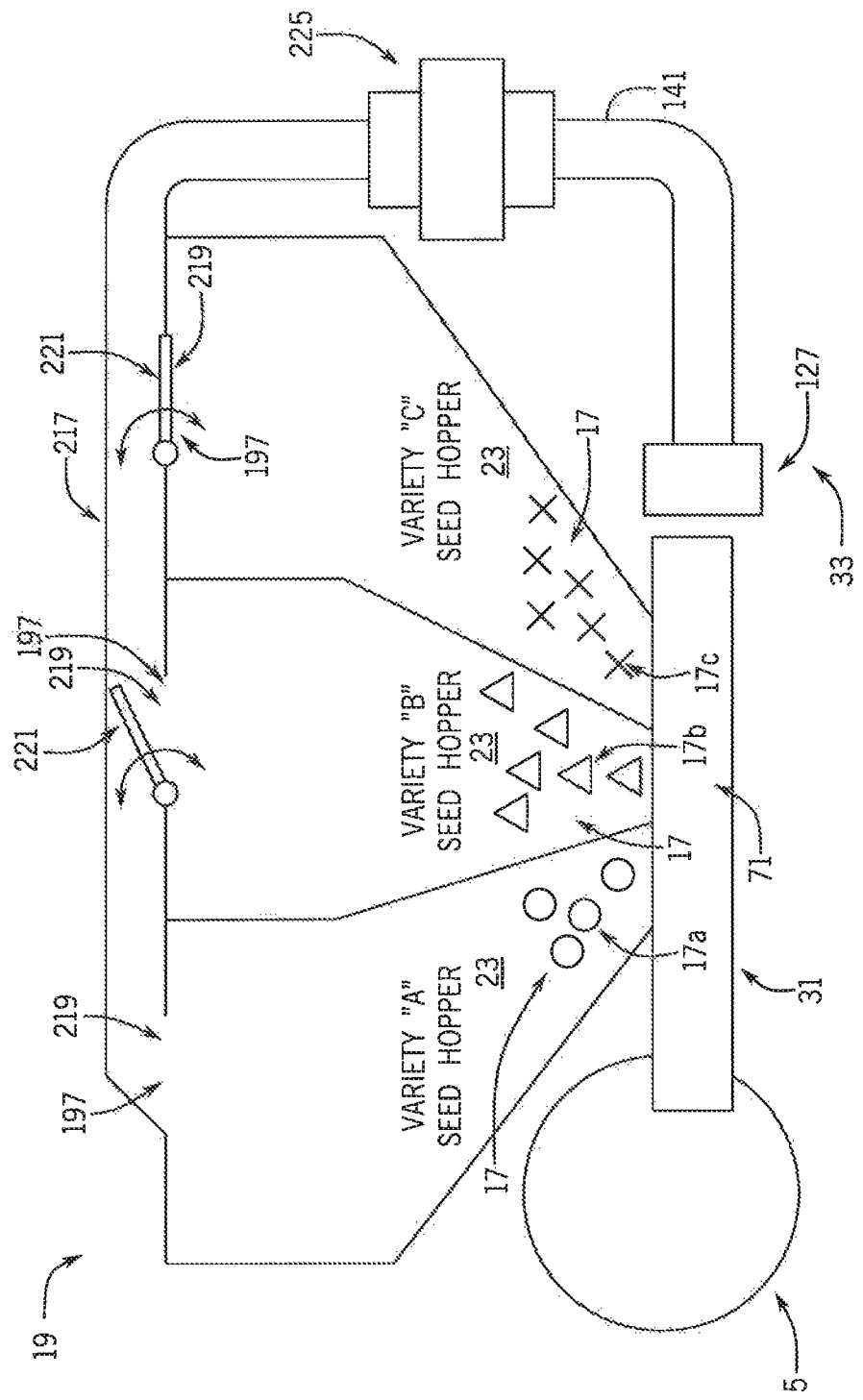
FIG. 13 is a simplified schematic representation of another variant of the segmented feed pipe and purging systems.

Referring now to FIGS. 12-13, these purging systems 33 have a fixed or non-selectable manifold arrangement, without diverter 105 between selector pipe 71 and purge tube manifold 127, and with a single purge hose 141. The single purge hose 141 directs seed 17 removed from seed meter 5 into diverter duct system 217 that selectively delivers seed 17 into a particular appropriate compartment that corresponds to the seed variety 17a, 17b, 17c being removed from seed meter 5. Referring to FIG. 12, diverter duct system 217 is shown mounted to seed return inlets 219, shown here defined by valve housing purge inlets 197 of piston airlock valve assemblies 157. Seed return valves may be defined by seed return inlet gates 221, which provide doors that are moved between open and closed positions by actuators controlled by control system 201 (FIG. 2) and are arranged within the diverter duct system 217 to selectively define seed flow paths to the piston airlock valve assemblies 157 that feed the appropriate compartment 23 for the particular seed variety 17a, 17b, 17c. As shown in FIG. 12, the piston airlock valve assembly 157 that is farthest from purge hose 141 may not need a seed return inlet gate 221. Closing the remaining seed return inlet gates 221 allows seed variety 17a to flow past the compartments 23 for seed varieties 17b, 17c and into the compartment that holds seed variety 17a through its piston airlock valve assembly 157. Opening the left seed return inlet gate 221 and closing the right seed return inlet gate 221 allows seed variety 17b to flow past the compartment 23 for seed variety 17c and into the compartment that holds seed variety 17b through its piston airlock valve assembly 157. Opening the right seed return inlet gate 221 allows seed variety 17c to flow into the compartment that holds seed variety 17c through its piston airlock valve assembly 157. When piston airlock valve assemblies 157 are implemented, valve plunger 171 (FIG. 4) may control flow of seed from the valve assembly 157 into compartment 23. Seed delivery control into the compartments 23 may also be done with compartment inlet gates 223 that provide doors that are moved between open and closed positions by actuators controlled by control system 201 (FIG. 2). Similar to the valve plunger 171 of the piston versions of airlock valve assembly 157, the compartment inlet gate(s) 223 in the airlock valve assembly 157 shown in FIG. 12 also restricts airflow from entering the valve assembly 157 from the compartments 23. In this way, inlet gates 223 shut off any significant amount of airflow between the compartments 23 and the airlock valve assemblies 157 to prevent pulling seed out of the compartments 23 and instead insure only pulling seed out of seed meter 5. FIG. 13 shows a purging system 33 that differs from the one shown in FIG. 12 because purging system 33 in FIG. 13 has no purge vacuum line 173 or piston airlock valve assemblies 157. Instead of using vacuum pressure pulled upstream of the compartments 23, purging system 33 of FIG. 13 includes an in-line pneumatic conveyor 225 arranged in purge hose 141, between the purge tube manifold 127 and diverter duct system 217. Pneumatic conveyor 225 is driven by compressed air from an air compressor that may be part of an air pressure system and/or seed conveyance airflow system to create vacuum pressure upstream of the conveyor 225 within segmented feed pipe system 31 to pneumatically remove seed from seed meter 5 and positive pressure downstream of the conveyor 225 to pneumatically push the removed seed toward the compartments 23 for storage.

Figure 14:
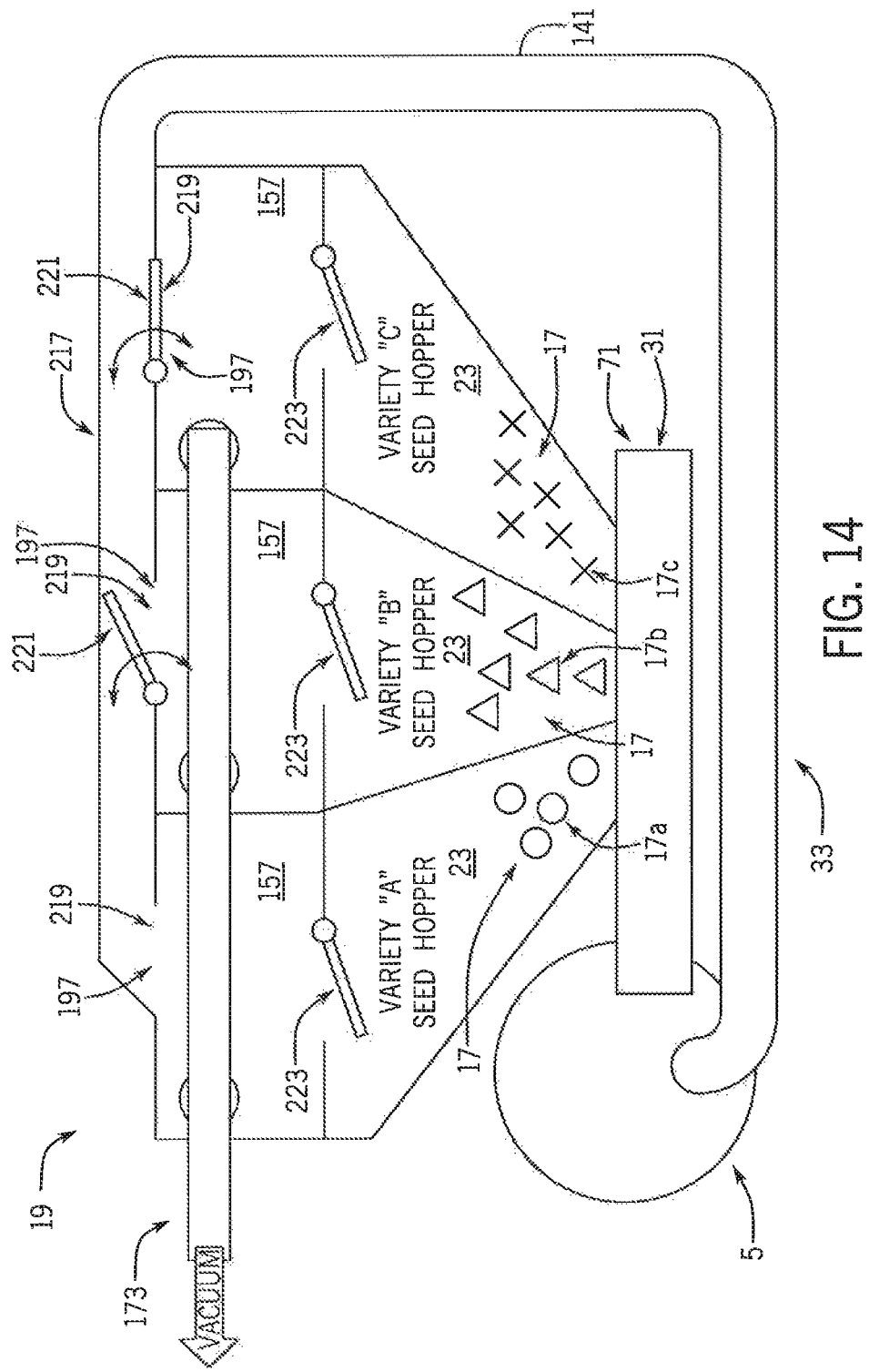
FIG. 14 a is a simplified schematic representation of another variant of the segmented feed pipe and purging systems.
Figure 15:
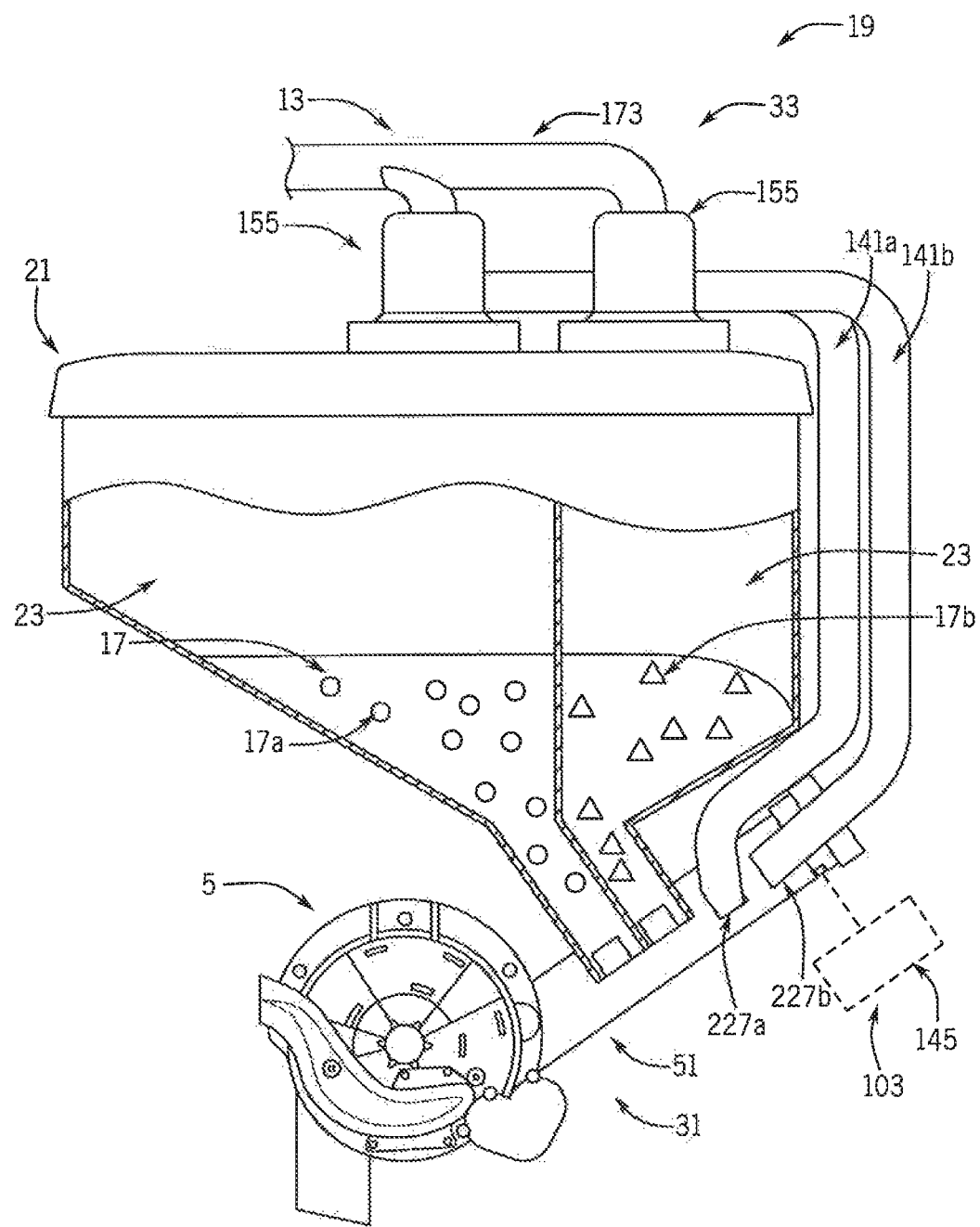
FIG. 15 is a simplified partially schematic side elevation of another variant of the segmented feed pipe and purging systems.

Referring now to FIGS. 14-15, purging systems 33 are shown without purge tube manifold 127 (FIGS. 12-13). The purging system 33 of FIG. 14 has a dedicated common purge hose 141 with gates 221 that can be actuated by control system 201 to select the compartment 23 to which the seed 17 returns. Gates 21 are shown here arranged within diverter duct system 217 that may be attached to the common purge hose 141, which removes seed from the sump or seed pool and directs the removed seed to compartments 23 without flowing through segmented feed pipe system 31. The purging system 33 of FIG. 15 has a dedicated purge hose 141a, 141b for each seed variety 17a, 17b that connects directly to and receives seed through purging ports 227a, 227b of sleeve 51 instead of a purge tube manifold 127 (FIGS. 12-13). Purging ports 227a, 227b are longitudinally spaced from each other along sleeve 51 and selectively align with longitudinally and radially spaced purging openings of selector pipe 71 so that the purging openings and purging ports 227a, 227b operate similarly to sleeve inlet ports 65a, 65b (FIG. 3) and selector pipe inlet ports 85a, 85b (FIG. 3), only for removing seed from seed meter 5 instead of delivering seed into seed meter 5.

Instead of removing seed with purging system 33, seed switching may be provided by a switching strategy that minimizes mixing during controlled seed introduction into seed meter 5. This may include using sump inlet gate 68 to stop introduction of seed into seed meter 5 in preparation of active switching and/or rotating selector pipe 71 to a plugged or dummy section that does not allow seed passage.

Figure 16:
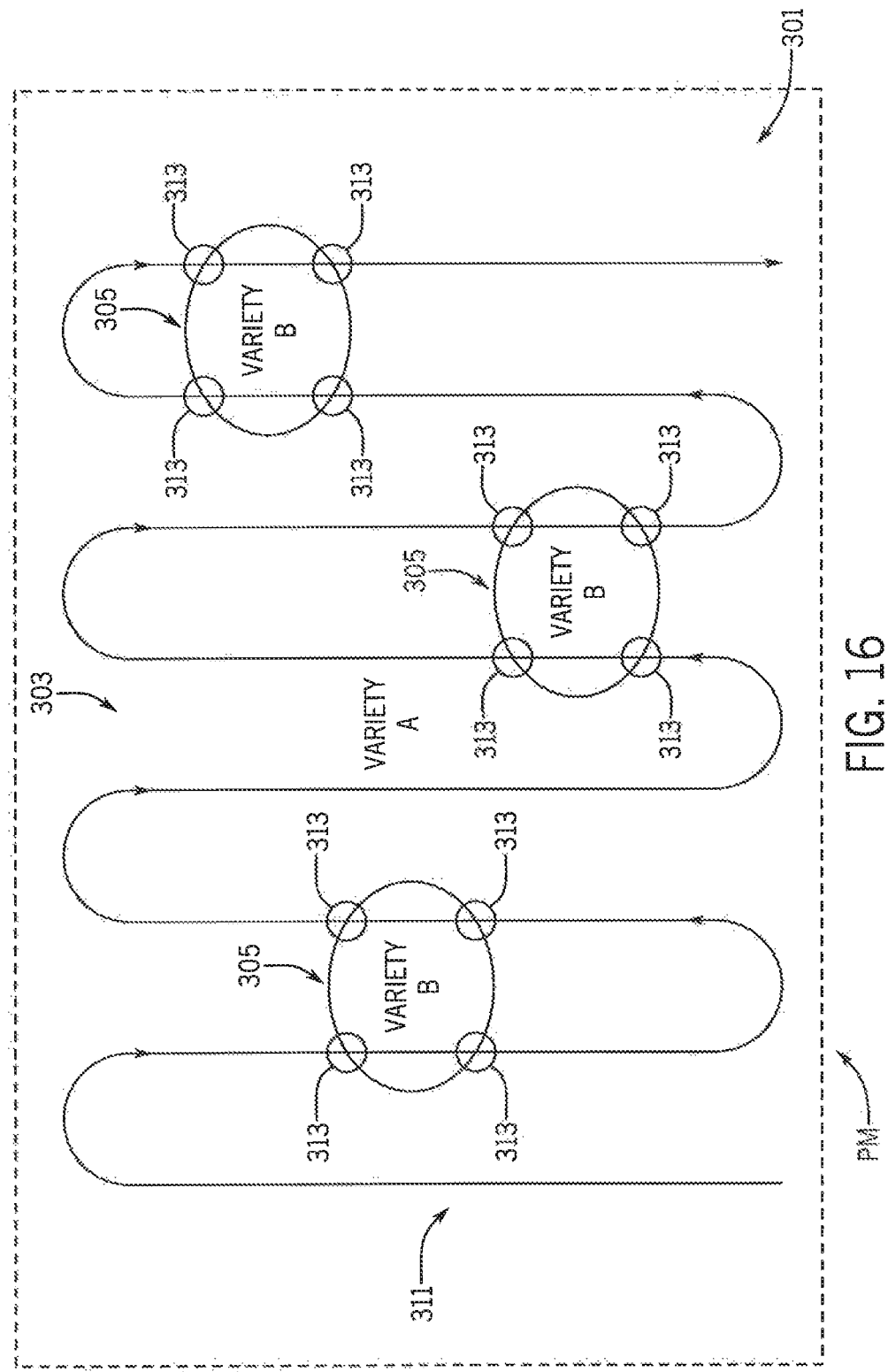
FIG. 16 is a simplified representation of a prescription map shown on a path map of multiple variety planting of a field.

Referring generally to FIGS. 2-3 and with further reference to FIG. 16, one example of control system 201 (FIG. 2) commanding seed switching with purging or seed removal with two seed varieties 17a, 17b, in field with two variety zones may occur in the following way. Referring now to FIG. 16, a path map is shown with a simplified schematic representation of a prescription map of field 301 showing the two zones of Variety-A and Variety-B respectively shown as zones 303 and 305 for receiving the two different varieties of seed 17a, 17b. Tractor 9 (FIG. 1) and planter 7 (FIG. 1) travel along path 311 through field 301 while traveling through the Variety-A zone(s) 303 and Variety-B zone(s) 305. Seed variety switching events are shown as circles labeled as switching events 313. As shown in FIG. 16, initially, steady state planting of seed variety 17a occurs until reaching the first seed-switching event 313 to change planting to variety 17b. As initial preparations for switching, such as when the planter 7 (FIG. 7) is a predetermined distance or time from the first-to-be-encountered seed-switching event 313, control system 201 (FIG. 2) may command closing sump inlet gate 68 (FIG. 3) to block further release of seed variety 17a, through sump inlet 49 (FIG. 3) and/or or may include energizing diverter drive system motor 147 (FIG. 3) to rotate diverter 105 and selector pipe 71 (FIG. 3) to cover the sleeve outlet port 67 (FIG. 3) and inlet ports 65a, 65b (FIG. 3). Control system 201 may command removal of at least some of deactivated seed 17a from seed pool 35 (FIG. 2) of seed meter 5 (FIG. 2). This may include further rotating selector pipe 71 (FIG. 3) to align diverter cap outlet collar 123 (FIG. 3) with the purge tube manifold outlet 139 associated with the purge hose 141a. This also moves the purge opening 101a to a position for removing the deactivated seed variety 17a from seed pool 35 and conveying the removed seed through purge passage 95a into its purge hose 141a. The removed seed variety 17a may then be collected in seed return valves and released back into compartment 23 with seed variety 17a, as shown in and described with respect to FIGS. 7-8. Control system 201 commands further rotation of selector pipe 71 to align selector pipe inlet port 85b (FIG. 3) with sleeve inlet port 65b (FIG. 3). This allows seed variety 17b to flow through selector pipe seed delivery passage 91b (FIG. 2) into seed meter 5. At the next seed-switching event 313 corresponding to exiting the Variety-B zone 305 and reentering the Variety-A zone 305, control system 201 commands switching from seed variety 17b back to seed variety 17a in the same way as described with respect to the initial switch from seed variety 17a to seed variety 17b, only starting with seed variety 17b as the deactivated variety to be stopped and removed. The process repeats in this way during planting and is modified based on the particular configuration of components of the segmented feed pipe system 31 and purging system 33, including the number of variety zones in the field and the number of seed varieties being planted.

Many changes and modifications could be made to the invention without departing from the spirit thereof. Various components and features of the system 5, for example, components, or features of the seed storage system(s), charging system(s), and seed metering system(s) can be incorporated alone or in different combinations on a planter. The scope of these changes will become apparent from the appended claims.

We claim:

1. A multiple variety seed meter of a planter for planting multiple seed varieties in a single planting pass during row-crop planting of an agricultural field, wherein the multiple seed varieties are stored in multiple seed storage compartments on the planter, the multiple variety seed meter comprising:
- a seed meter housing arranged at a row unit of a planter and defining an enclosure that surrounds a housing cavity that can receive seed to define a seed pool;
- a seed disk arranged within the housing cavity and configured to pick up seed from the seed pool at a seed pickup region for singulation of seeds from the seed pool for individual delivery onto the agricultural field while planting;
- a segmented feed pipe system that extends between the seed meter housing and the multiple seed storage compartments; the segmented feed pipe system comprising:
  - an outer sleeve that extends from the seed meter housing, the outer sleeve including:
    - an outer sleeve inlet end with a first sleeve inlet port arranged to receive a first seed variety from a first one of the multiple seed storage compartments and a second sleeve inlet port arranged to receive a second seed variety from a second one of the multiple seed storage compartments;
  - an inner selector pipe arranged for rotation within the outer sleeve, the inner selector pipe including:
    - an inner selector pipe inlet end with a first selector pipe inlet port arranged to receive the first seed variety and a second selector pipe inlet port arranged to receive the second seed variety; and
  - wherein rotation of the inner selector pipe within the outer sleeve can selectively align the first selector pipe inlet port with the first outer sleeve inlet port to allow the first seed variety to flow through the segmented feed pipe system and into the seed pool for planting the first seed variety and align the second selector pipe inlet port with the second outer sleeve inlet port to allow the second seed variety to flow through the segmented feed pipe system and into the seed pool for planting the second seed variety.

2. The multiple variety seed meter of claim 1, wherein the outer sleeve includes a sleeve outlet end with a sleeve outlet port arranged in the housing cavity to define a sump inlet through which seed can be delivered into the seed pool, and wherein the inner selector pipe includes a selector pipe outlet end with a first selector pipe outlet port and a second selector pipe outlet port arranged at the outlet end and arranged so that rotation of the selector pipe can selectively align the first and second selector pipe outlet ports with the sleeve outlet port for respectively delivering the first and second seed varieties into the housing cavity through the sump inlet.

3. The multiple variety seed meter of claim 2, wherein the inner selector pipe includes,
- a first seed delivery passage extending between the first selector pipe inlet port and the first selector pipe outlet port for delivering the first seed variety through the segmented feed pipe system; and
- a second seed delivery passage extending between the second selector pipe inlet port and the second selector pipe outlet port for delivering the second seed variety through the segmented feed pipe system.

4. A multiple variety planter for planting multiple seed varieties in a single planting pass during row-crop planting of an agricultural field, the multiple variety planter comprising:
- a frame;
- multiple seed storage compartments supported by the frame for respectively storing multiple seed varieties;
- multiple row units supported by the frame with each of the row units comprising:
  - a seed meter for singulating seed to be planted, the seed meter defining a seed pickup region inside the seed meter;
  - a segmented feed pipe system arranged between the seed meter and the multiple seed storage compartments; the segmented feed pipe system comprising:
    - a feed pipe with multiple passages that respectively receive the multiple seed varieties from the multiple seed storage compartments, wherein the feed pipe is rotatable and includes multiple variety outlets each of which can be rotated during rotation of the feed pipe to deliver seed to the seed pickup region inside the seed meter; and
    - a seed diverter system arranged to drive rotation of the feed pipe for presenting one of the multiple variety outlets of the feed pipe to deliver the corresponding seed variety to the seed pickup region inside the seed meter.

5. The multiple variety planter of claim 4, wherein the segmented feed pipe system comprises an outer sleeve and the feed pipe defines an inner selector pipe with multiple seed delivery passages for respectively directing the multiple seed varieties through the inner selector pipe toward the multiple variety outlets.

* * * * *